US011914188B1

United States Patent
Lee et al.

(10) Patent No.: US 11,914,188 B1
(45) Date of Patent: Feb. 27, 2024

(54) SUSPENDED WAVEGUIDES ON MEMBRANE AND NEEDLE STRUCTURES TOWARDS PHOTONIC ATOM TRAP INTEGRATED PLATFORMS

(71) Applicant: National Technology & Engineering Solutions of Sandia, LLC, Albuquerque, NM (US)

(72) Inventors: Jongmin Lee, Albuquerque, NM (US); Michael Gehl, Edgewood, NM (US); Grant Biedermann, Norman, OK (US); Yuan-Yu Jau, Albuquerque, NM (US); Christopher T. DeRose, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 161 days.

(21) Appl. No.: 17/546,302

(22) Filed: Dec. 9, 2021

Related U.S. Application Data

(60) Provisional application No. 63/141,164, filed on Jan. 25, 2021.

(51) Int. Cl.
*G02B 6/12* (2006.01)
*G02B 6/122* (2006.01)
*G02B 6/43* (2006.01)

(52) U.S. Cl.
CPC ....... *G02B 6/1228* (2013.01); *G02B 6/12004* (2013.01); *G02B 6/43* (2013.01);
(Continued)

(58) Field of Classification Search
CPC .... G02B 6/1228; G02B 6/12004; G02B 6/43; G02B 2006/12061; G02B 2006/12121
(Continued)

(56) References Cited

U.S. PATENT DOCUMENTS 7,859,350 B1 * 12/2010 Schwindt .................. G04F 5/14
331/3
9,766,071 B2 9/2017 Compton et al.
(Continued)

FOREIGN PATENT DOCUMENTS

EP 2104406 A1 9/2009

OTHER PUBLICATIONS

Beguin, et al., "Advanced apparatus for the integration of nanophotonics and cold atoms", In Optica, vol. 7, Issue 1, Jan. 2020, 2 Pages.
(Continued)

*Primary Examiner* — Kaveh C Kianni
*Assistant Examiner* — Hung Q Lam
(74) *Attorney, Agent, or Firm* — Mark A. Dodd

(57) ABSTRACT

An atom trap integrated platform (ATIP) comprises a substrate, a membrane, and a suspended waveguide. The substrate has an opening formed therein. The membrane extends across a portion of the substrate opening. The suspended waveguide is formed on the membrane such that the suspended waveguide extends from a first edge of the substrate to a second edge. A magneto-optical trap (MOT) is formed around the suspended waveguide by emitting a plurality of cooling beams and a repump through the substrate opening. Evanescent fields are established above the suspended waveguide by coupling two trapping beams through the suspended waveguide, which trapping beams are red-detuned and blue-detuned with respect to the resonant optical transition of the atoms. By forming the MOT within the evanescent fields, an evanescent field optical trap (EFOT) is formed.

19 Claims, 14 Drawing Sheets

(52) U.S. Cl.
CPC .............. *G02B 2006/12061* (2013.01); *G02B 2006/12121* (2013.01)

(58) Field of Classification Search
USPC ........... 385/6–8, 14–15, 30–31, 43, 129–132
See application file for complete search history.

(56) References Cited

U.S. PATENT DOCUMENTS

| | | |
|---|---|---|
| 10,801,840 B1 | 10/2020 | Solmeyer et al. |
| 2015/0355040 A1* | 12/2015 | Sirbuly .................. G01L 1/242 356/73.1 |

OTHER PUBLICATIONS

Gehl, et al., "Characterization of Suspended Membrane Waveguides towards a Photonic Atom Trap Integrated Platform", Sandia National Laboratories, Jan. 2021, 12 Pages.

Jaffe, et al., "Efficient Adiabatic-Spin Dependent Kicks in an Atom Interferometer", In Physical Review Letters, vol. 121, Apr. 4, 2002, 2018, 6 Pages.

Kovachy, et al., "Adiabatic-rapid-passage multiphoton Bragg atom optics", In Physical Review A, vol. 86, 011606(R), 2012, 5 Pages.

Lee, et al., "Demonstration of a MOT in a Sub-Millimeter Membrane Hole", Sandia National Laboratories, Nov. 2020, 11 Pages.

Lee, et al., "Inhomogeneous broadening of optical transitions of 87Rb atoms in an optical nanofiber trap", In Journal of Physics B: Atomic, Molecular and Optical Physics, vol. 48, No. 16, 2015, 7 Pages.

Lee, et al., "Integrated optical dipole trap for cold neutral atoms with an optical waveguide coupler", In New Journal of Physics, vol. 15, Apr. 2013, 15 Pages.

Lee, et al., "Matterwave Sagnac interferometer using nanoscale optical waveguides", Sandia National Laboratories, Jul. 15, 2020, 57 Pages.

Lee, Jongmin, "Deployable Cold Atom Interferometry Sensor Platforms Based on Diffractive Optics and Integrated Photonics", Sandia National Laboratories, SAND2020-9489C, 30 Pages.

Mcdonald, et al., "Optically guided linear Mach-Zehnder atom interferometer", In Physical Review A, vol. 87, Jan. 2013, 5 Pages.

Meng, et al., "A nanowaveguide platform for collective atom-light interaction", In Applied Physics Letters, vol. 107, Sep. 2, 2015, 6 Pages.

Muller Group, "Atom interferometry Introduction", Retrieved From: http://matterwave.physics.berkeley.edu/atom-interferometry, Retrieved Date: Feb. 2, 2021, 4 Pages.

Orozco, et al., "Coherence of Trapped Atoms in a 1-D Evanescent Field Optical Dipole Trap", In Optics Letters, Feb. 1, 2021, 8 Pages.

Orozco, et al., "Nanofiber testbed for guided atom interferometry", Sandia National Laboratories, UNM CQuIC 2020, 29 Pages.

West, "Systematic effects in two-dimensional trapped matter-wave interferometers", In Physical Review A, vol. 100, Issue 6, Dec. 9, 2019, 8 Pages.

West, et al., "Tunable transverse spin-motion coupling for quantum information processing", In Quantum Science and Technology, vol. 6, No. 2, Jan. 20, 2021, 14 Pages.

Xin, et al., "An atom interferometer inside a hollow-core photonic crystal fiber", In Science Advances, vol. 4, Jan. 19, 2018, 7 Pages.

\* cited by examiner

SUSPENDED WAVEGUIDES ON MEMBRANE AND NEEDLE STRUCTURES TOWARDS PHOTONIC ATOM TRAP INTEGRATED PLATFORMS

RELATED APPLICATIONS

This application claims priority to U.S. Provisional Application No. 63/141,164, filed on Jan. 25, 2021, and entitled SUSPENDED WAVEGUIDES ON MEMBRANE AND NEEDLE STRUCTURES TOWARDS ATOM TRAP INTEGRATED PLATFORMS, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

BACKGROUND

A microfabricated optical waveguide has been considered for use in connection with quantum computing, quantum communication and networks, quantum sensing, etc. The one-dimensional (1-D) guided atoms in a linear or a closed-loop geometry can be used for guided atom interferometry accelerometers or gyroscopes. Analogous to a tapered optical fiber (TOF), the integrated photonic waveguide can optically guide small evanescent-field modes for strong atom-light interaction and an evanescent-field optical trap (EFOT).

In a free-space magneto-optical trap (MOT), a plurality of cooling beams and a repump beam generate Doppler-cooled atoms with a magnetic field gradient (e.g., that are present in a vacuum chamber within which the MOT is developed). The number of laser-cooled atoms in a MOT depends on the beam diameter, intensity, and detuning of the laser cooling beams, and the magnetic field gradient. An additional sub-Doppler cooling process allows atoms to reach a temperature of ~10 μK. These atoms need to be loaded at the proximity of micro-fabricated structures for optical traps, e.g., EFOTs, or magnetic traps, e.g., atom chips, and can be optically or magnetically trapped if the traps have a deeper trap depth than the temperature of the cold atoms and the spatial overlap between the atoms and the traps is sufficient for efficient atom loading into the traps.

The EFOT with microfabricated optical waveguides has not been successfully demonstrated yet due to two significant challenges: sufficient optical power delivery at the suspended region of the optical waveguide in vacuum and efficient atom loading into the waveguide atom traps. First, the optical absorption from the waveguide material is usually $10^5$ times higher than that of TOFs using a doped-silica optical fiber, which generates heat at the suspended region of the waveguide and limits the power delivery that can be delivered in vacuum prior to mechanical failure of the waveguide. Second, the waveguide fabricated above the substrate can handle a high optical power in vacuum, but due to the collision between cold atoms and device surfaces, the number of cold atoms that can be trapped is severely degraded within a distance of a couple hundred nanometer proximity of the waveguide on the substrate. These problems have previously been addressed by, for example, using a free-space optical trapping beam, such as an optical conveyor belt or an optical tweezer, by which a singly trapped atom is transported from a free-space MOT, which is positioned away from the waveguide to the evanescent field of the waveguide for atom-light interaction experiments.

SUMMARY

The following is a brief summary of subject matter that is described in greater detail herein. This summary is not intended to be limiting as to the scope of the claims.

Various technologies pertaining to EFOTs with integrated membrane waveguide platforms, called photonic atom trap integrated platforms (ATIPs), are described herein. See, M. Gehl, et. al., "Characterization of suspended membrane waveguides towards a photonic atom trap integrated platform," Optics Express, vol. 29, no. 9, art. no. 13129 (2021); and J. Lee, et. al., "Demonstration of a MOT in a sub-millimeter membrane hole," Scientific Reports, vol. 11, art. no. 8807 (2021), the contents of each of which are incorporated herein by reference. ATIPs are integrated photonic devices that are adapted to facilitate trapping of atoms near a surface of a waveguide by way of the EFOT. In an exemplary embodiment, an ATIP includes a substrate that has an opening formed with a membrane that extends across the substrate opening. In some embodiments, a suspended waveguide formed on the membrane extends across an opening in the membrane. In other embodiments, the suspended waveguide formed on the membrane extends over the substrate opening and proximal to an opening or between multiple openings in the membrane. As will be described in greater detail below, the membrane and/or substrate can include various features that are adapted to facilitate formation of an EFOT above the suspended waveguide, and dissipation of heat away from the suspended waveguide. Various integrated photonics and electronics can be integrated into the ATIP through the substrate (e.g., composed of silicon, silicon dioxide, fused-silica, or quartz), including optical resonators, Mach-Zehnder interferometric waveguides, heterogeneously integrated photonics with silicon- or III-V-based elements, piezoelectric material on waveguides, polymer waveguides, microwave/RF transmission lines and antennas, DC voltage electrodes, current driving lines, etc.

The ATIP can be used for quantum computing, quantum communication and networks, quantum sensing, etc., that includes a control system, a laser system, a magnetic field system, and a vacuum chamber. The ATIP can be disposed within the vacuum chamber. The magnetic field system is composed of current drivers and coils, which can establish a magnetic field gradient using anti-Helmholtz coils and compensate astray magnetic fields with bias magnetic fields using three-axis Helmholtz coils in a region around the suspended waveguide of the ATIP. The laser system can be controlled to emit a plurality of cooling beams to a point of intersection that is within the region in which the magnetic field is established. The cooling beams can be emitted through the optically transparent membrane on the substrate to form cold dense atoms around the opening of the membrane or the suspended waveguide that extends across the opening of the membrane.

To facilitate transmission of the cooling beams to the point of intersection, cold dense atoms can be generated at the opening of the membrane or at the suspended waveguide that extends across the opening. The material and geometry of the membrane and suspended waveguide can be chosen and designed for substantial transparency at the wavelength of the cooling beams and sufficient dissipation of the heat generated from optical absorption at the suspended waveguide in vacuum (e.g., sufficient to prevent mechanical failure of the suspended waveguide). Further, to facilitate migration of atoms around the membrane into the MOT, the membrane that extends over the opening in the substrate can have one or more apertures formed therein. Thus, the substrate has an opening over which the membrane extends, and the membrane has a distinct aperture, or opening, formed therein.

At the point of intersection of the cooling beams, a MOT is formed at the interaction region of six cooling beams, where the magnetic field is locally zero. The laser system may have multiple laser and optical components for (1) the MOT, (2) the EFOT, (3) coherent atomic control, and (4) atomic population measurement. The laser system is controlled by control system electronics, which communicate with a user interface and control the timing sequence of operation of the lasers. For Doppler cooling and sub-Doppler cooling procedures with the MOT, the intensity, detuning, and pulse timing of cooling beams and a repump beam are controlled.

In connection with establishing an EFOT above the suspended waveguide of the ATIP, two-color evanescent field trapping beams are coupled into the suspended waveguide. The trapping beams include a red-detuned beam and a blue-detuned beam, the intensity, detuning, and pulse timing of which are controlled. The red-detuned beam is red-detuned with respect to the resonant optical transition of the atoms of an atomic ensemble that are present in the vacuum chamber and trapped in the MOT. The blue-detuned beam is blue-detuned with respect to the same resonant optical transition of the atomic ensemble. The red-detuned and blue-detuned beams establish, respectively, attractive and repulsive evanescent fields that result in trap potentials around the suspended waveguide. In particular, repulsive evanescent fields need to compensate near-surface attractive potential, such as van der Waals. The interaction of these fields establishes an EFOT around the suspended waveguide at a distance, e.g., of less than or equal to approximately 200 nanometers from the suspended waveguide, which distance is less than a distance from the center of the MOT to the suspended waveguide. The EFOT and the MOT can be overlapping in a region about the suspended waveguide, such that some of the atoms in the MOT are loaded into the EFOT. The atoms trapped in the EFOT can be addressed with the evanescent-field waveguide modes for coherent atom control or atom state measurement.

Once the atoms are guided to an EFOT, e.g., the evanescent field optical dipole trap (EF-ODT) with red-detuned and blue-detuned travelling-wave trapping beams, atoms can move freely along the guided geometry (e.g., a path of the suspended waveguide in the ATIP), and the atomic state can be coherently controlled with the waveguide-coupled evanescent field (or free-space beam) of Doppler-free or Doppler-sensitive Raman beams. The Doppler-free Raman beams can coherently control atomic states without the state-dependent momentum transfer. The Doppler-sensitive Raman beams can coherently control atomic states and provide the state-dependent momentum kicks, i.e., photon recoils, that induce the motion of the trapped atoms in the EFOT guided along a path of the suspended waveguide. In connection with controlling motion of atoms along the suspended waveguide of the ATIP, the intensity, detuning, and pulse timing of two-photon Raman beams coupled into the suspended waveguide are controlled toward a cold atom inertial sensor system.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

DETAILED DESCRIPTION

Figure 1:
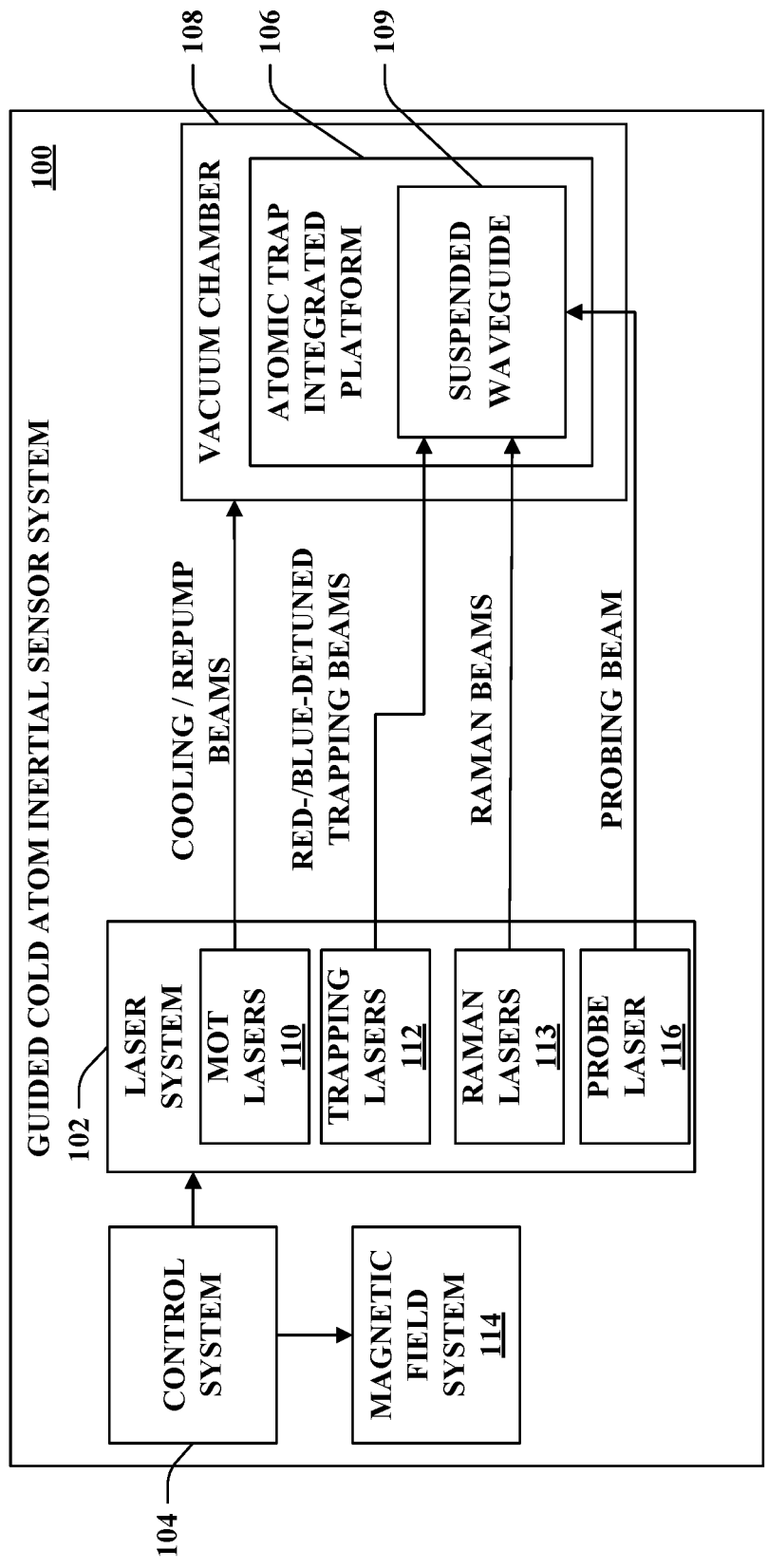
FIG. 1 is a functional block diagram of an exemplary guided cold atom inertial sensor system.

Various technologies pertaining to integrated membrane waveguide platforms are now described with reference to the drawings, wherein like reference numerals are used to refer to like elements throughout. With greater specificity, technologies pertaining to ATIPs implemented in integrated photonics are described herein. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be adapted to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, an exemplary guided cold atom inertial sensor system 100 that facilitates laser cooling and trapping of neutral atoms in a MOT formed near the surface of a suspended waveguide is illustrated. The system 100 includes a laser system 102, a control system 104, an ATIP 106, and a vacuum chamber 108 within which the ATIP 106 is disposed. In the vacuum chamber 108, an atom source, for example, an alkali metal dispenser (not illustrated), generates a population of neutral atoms suitable for a MOT. Briefly, the laser system 102 is adapted to create a MOT in a vicinity of the ATIP 106, and to further establish an evanescent-field mode guided through a suspended waveguide 109 that is a part of the ATIP 106. The red-detuned and blue-detuned evanescent-field modes guided through the suspended waveguide 109 establish an EFOT. After loading cold atoms from a MOT to the suspended waveguide 109, the EFOT can trap atoms near a surface of the suspended waveguide 109. Once atoms are loaded into the EFOT, the laser system 102 can be further adapted to coherently control atomic states and guide movement of the atoms for various purposes, such as quantum sensing, quantum computing, quantum networks, or the like. By way of example, and not limitation, the guided cold atom inertial sensor system 100 can be employed in connection with a guided-atom-based interferometer.

The ATIP 106 is an integrated photonic device that is adapted to facilitate trapping atoms by an evanescent field in close proximity to a surface of the suspended waveguide 109. The ATIP 106 can be further adapted to monitor an atomic population of trapped atoms based upon optical signals transmitted through the suspended waveguide 109. As will be described in greater detail below, the suspended waveguide 109 is suspended over a region of empty space within the vacuum chamber 108 to facilitate loading of atoms into an EFOT in the vicinity of a surface of the suspended waveguide 109.

The laser system 102 comprises MOT lasers (cooling/repump lasers) 110, trapping lasers 112, Raman lasers 113 and a probe laser 116. The MOT lasers 110 are adapted to emit cooling beams, a repump beam, and a depump beam (for example an optical pumping beam for initial atomic state preparation) into the vacuum chamber 108 to illuminate the ATIP 106 or a region of space that is proximal to the ATIP 106 within the vacuum chamber 108. A magnetic field system 114 with an anti-Helmholtz coil establishes a magnetic field gradient (not shown) and, in combination with the MOT lasers 110, locates laser-cooled atoms at the magnetic field zero point in a region proximal to the ATIP 106 within the vacuum chamber 108. The MOT lasers 110 are adapted such that the cooling beams intersect within a region proximal to the ATIP 106 and nearby the surface of the ATIP 106 (e.g., within a distance of 500 micrometers, 250 micrometers, or 100 micrometers from the surface). By way of example, and not limitation, the MOT lasers 110 can be adapted or controlled (e.g., by the control system 104) such that a region of intersection of the cooling/repump beams intersects with the suspended waveguide 109. Intersection of the cooling beams within the magnetic field gradient established by the magnetic field system 114 establishes the MOT with a repump beam (e.g., emitted by a laser among the MOT lasers 110). The MOT is centered about an intersection of the cooling beams and confines a population of atoms within a region that is proximal to the ATIP 106 (e.g., within the region within which the magnetic field gradient is established). The magnetic field gradient established by the magnetic field system 114 and an intersection region of the cooling beams can both be overlapping with the suspended waveguide 109, such that the MOT intersects or overlaps with the suspended waveguide 109. In other words, the MOT causes a dense population of cooled atoms to be distributed about the suspended waveguide 109.

Figure 2A:
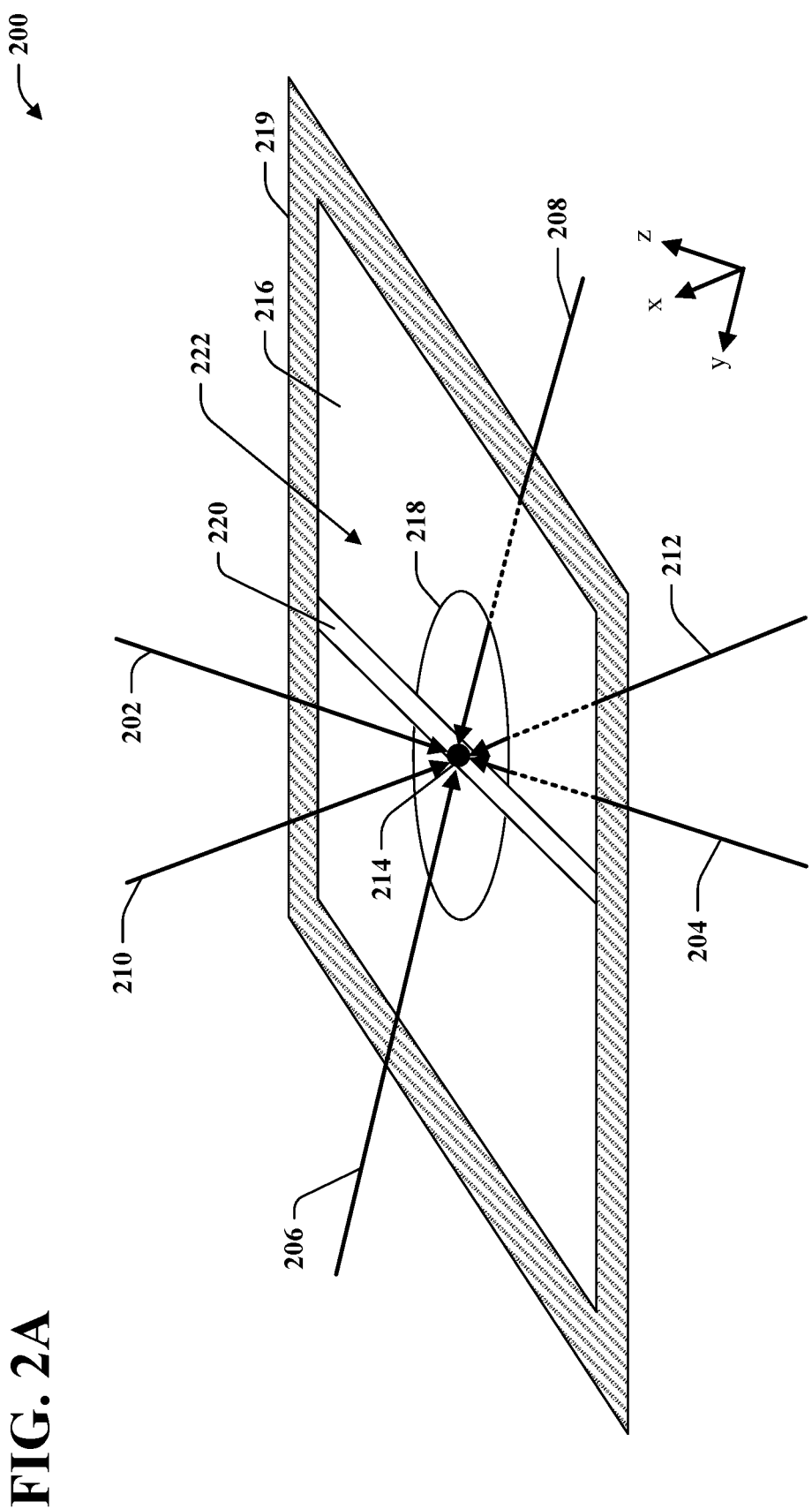
FIG. 2A is a perspective view of an exemplary ATIP that incorporates a suspended waveguide.
Figure 2B:
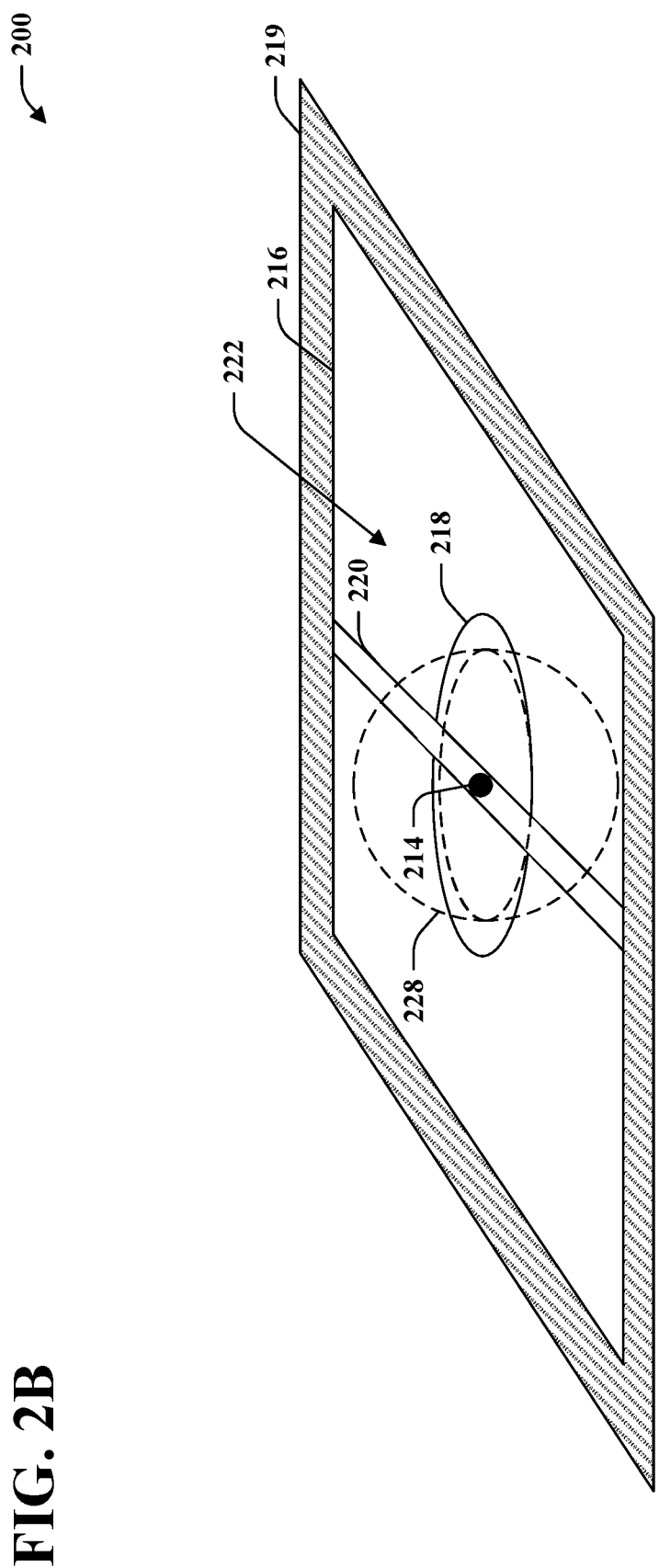
FIG. 2B is a perspective view of the exemplary ATIP of FIG. 2A that illustrates a MOT formed proximally to the ATIP.

By way of example, and with reference now to FIGS. 2A and 2B, an exemplary ATIP 200 is shown. FIG. 2A depicts the ATIP 200 and a plurality of six cooling beams 202-212 that intersect in a region 214 that is proximal to a surface of the ATIP 200. The exemplary ATIP 200 includes a membrane 216 having an aperture 218 formed therein, and a substrate 219 that supports the membrane 216. The ATIP 200 further includes a suspended waveguide 220 that is disposed on the membrane 216 and across the aperture 218, such that the suspended waveguide 220 is suspended over the aperture 218. The substrate 219 supports the membrane 216 around a periphery of the membrane 216, such that the ATIP 200 includes an interior portion 222 in which the substrate 219 is not present underneath the membrane 216. In other words, the substrate 219 has an opening formed therein over which the membrane 216 extends, and the membrane 216 has the aperture 218 formed therein, over which the suspended waveguide 220 extends. As will be described in greater detail below, however, in at least some embodiments, a suspended waveguide can extend proximally to one or more apertures, or between two apertures in a membrane. The aperture 218 can be a substantially circular aperture, with the suspended waveguide 220 extending across the aperture 218 and bisecting the aperture 218. In various embodiments, and as described in greater detail below, the aperture 218 can be formed by etching of the membrane 216, backside etching of the substrate 219, and releasing the membrane 216 from the substrate 219. Thus, since the suspended waveguide 220 is formed on the membrane 216, the aperture 218, when viewed from underneath, can be seen as two opposing circular segments, with a layer of membrane material extending along the length of the suspended waveguide 220 and contiguous with the remainder of the membrane 216.

The region 214 of intersection of the cooling beams 202-212 is disposed within or above the aperture 218. The cooling beams 202-212 are arranged in three orthogonal pairs of counter-propagating beams. Stated differently, the beams 202, 204 form a first pair of beams that propagate in opposite directions, which directions are orthogonal to the directions of propagation of the remaining beams 206-212. Similarly, beams 206, 208 are a second pair of beams propagating in opposite directions, which directions are orthogonal to the directions of propagation of beams 202, 204, 210, 212. Finally, beams 210, 212 are a third pair of beams propagating in opposite directions, which directions are orthogonal to the directions of propagation of beams 202-208. Each of the pairs of beams can propagate along one of an x-, y-, or z-axis shown in FIG. 2A.

Thermal management within the ATIP 106 is important due to high optical loss and absorption in the suspended waveguide 109 as compared with optical nanofibers, and the inability to conduct heat away from the ATIP 106 by convection due to the need for ultra-high vacuum conditions to form the MOT. In various embodiments, and referring once again to FIG. 2A, the substrate 219 is formed from silicon. Silicon has improved thermal conductivity as compared to, for example, silicon dioxide, and facilitates the transfer of heat away from the suspended waveguide 220.

When composed of silicon, the substrate 219 is substantially opaque with respect to wavelengths of the cooling beams 202-212. The membrane 216 is adapted to be substantially transparent to the cooling beams 202-212. For example, the membrane 216 can be thin (e.g., less than or equal to 75 nanometers thick, less than or equal to 50 nanometers thick, or less than or equal to 25 nanometers thick) and composed of a material that is substantially transparent to wavelengths of the cooling beams 202-212 for certain atomic species. In exemplary embodiments, the membrane 216 can be composed of any transparent material, such as aluminum oxide ($Al_2O_3$), silicon nitride ($Si_3N_4$), aluminum nitride (AlN), etc. The membrane 216 can be constructed so that the membrane 216 has a transmittance of greater than 90%, greater than 95%, or greater than 99% with respect to wavelengths of the cooling beams 202-212. The transmittance also depends on the light polarization (e.g., s- or p-polarized light) and incident angle.

Figure 3A:
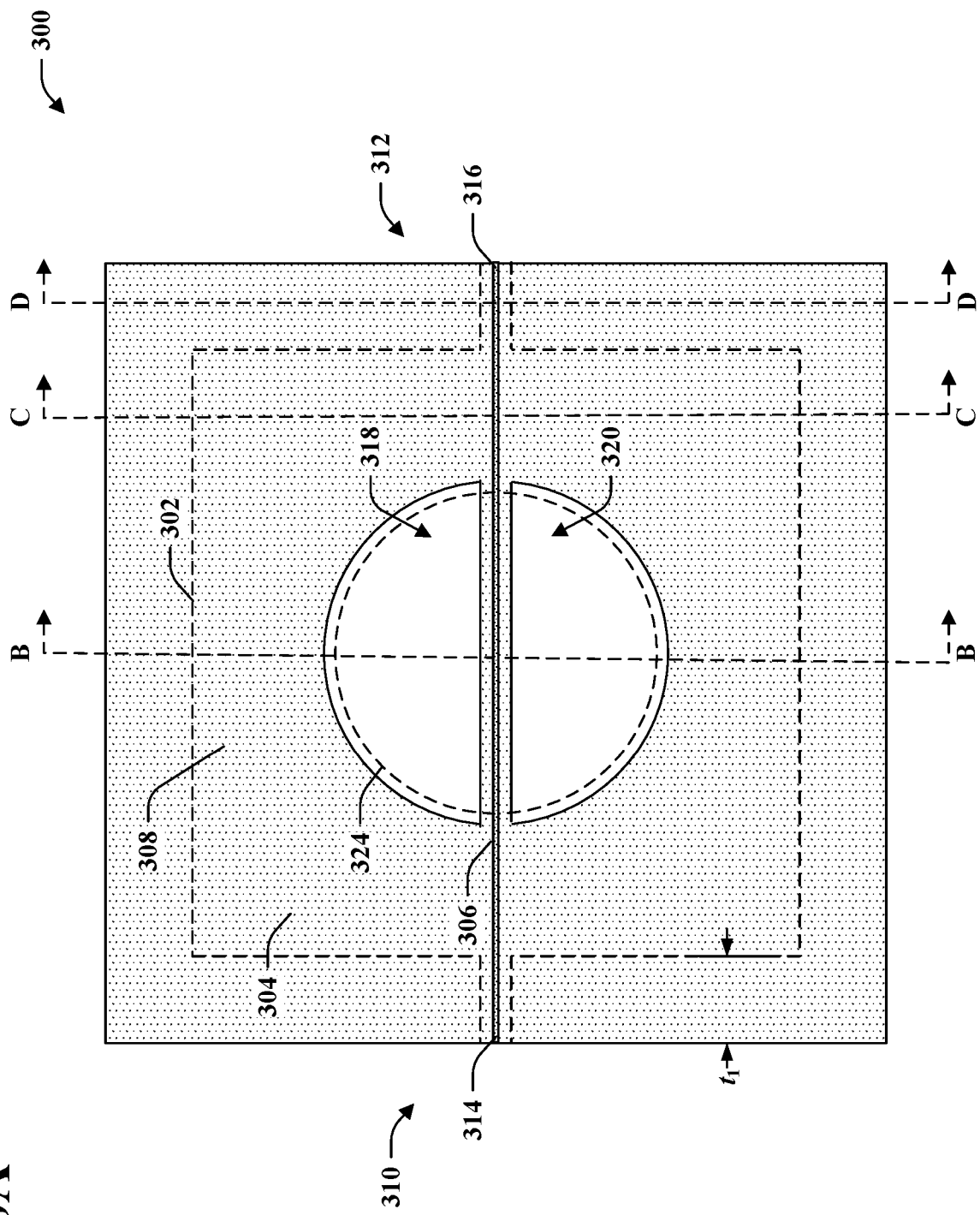
FIG. 3A is a top-down view of another exemplary ATIP.
Figure 3B:
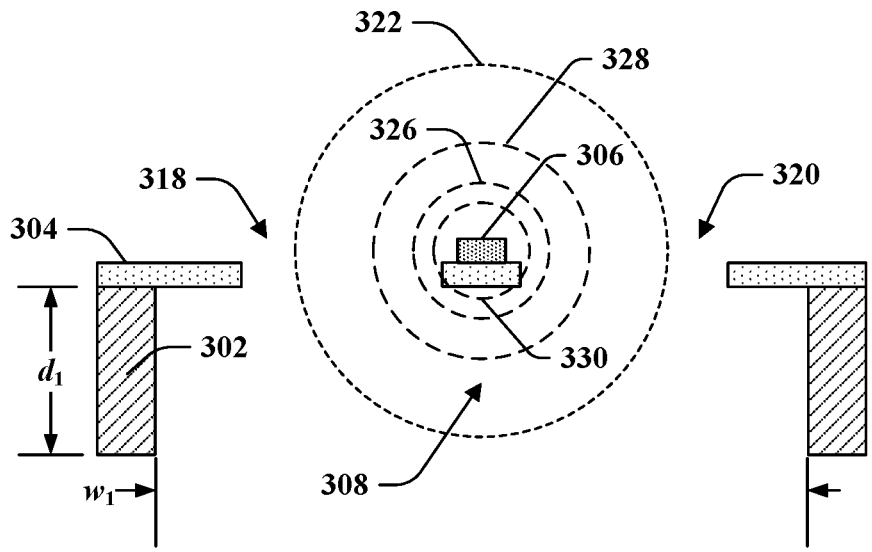
FIGS. 3B-3D are cross-sectional thin slices of the exemplary ATIP of FIG. 3A.
Figure 3C:
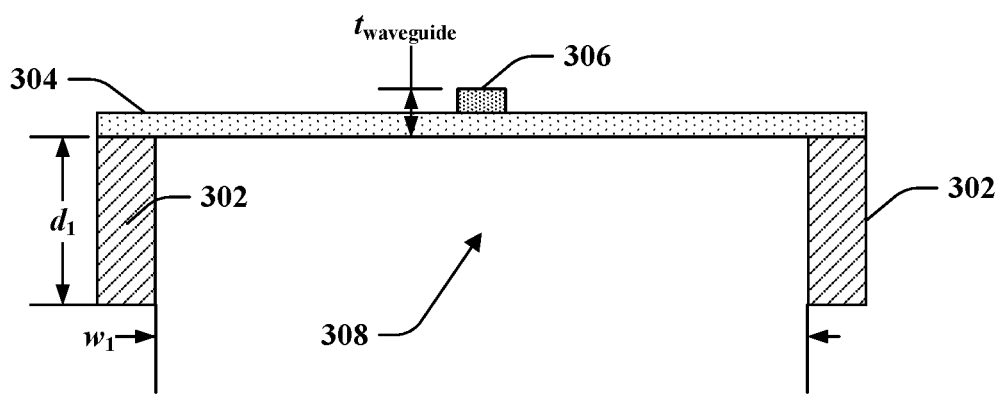

In exemplary embodiments, the height (or thickness) of the suspended waveguide 220, (see, e.g., the thickness $t_{waveguide}$ of suspended waveguide 306 shown in FIG. 3C), which can be, for example, a membrane ridge waveguide, can be less than or equal to 75 nanometers, less than or equal to 100 nanometers, less than or equal to 125 nanometers, or less than or equal to 150 nanometers, which is designed for optimal EFOTs with red-detuned and blue-detuned trapping beams and is independent of the optimal membrane thickness for high transmittance. This thin suspended waveguide 220 results in an optical mode that is weakly confined to the material of the suspended waveguide 220. This provides lower optical absorption relative to some other suspended waveguide geometries, reducing the heat generated within the suspended waveguide 220.

In some embodiments, a high refractive index waveguide core, e.g., silicon nitride (n=2.05), may be deposited and patterned as a suspended waveguide above a low refractive index membrane, e.g., aluminum oxide (n=1.76). This structure can thus be used as the suspended waveguide of an ATIP. In various embodiments, another low refractive index membrane, e.g., aluminum oxide (n=1.76), covers the high refractive-index waveguide core to protect the high refractive-index waveguide core from degradation by alkali atoms. In some embodiments, a high refractive index waveguide core, e.g., silicon nitride (n=2.05), above a low refractive index membrane, e.g., aluminum oxide (n=1.76), is surrounded by the top and bottom, sandwiched low refractive-index cladding layers, e.g., silicon dioxide (n=1.47), at input and output light coupling regions, rather than the suspended waveguide with the top open space and the bottom void in the substrate, which allows reliable optical packaging by way of fiber-to-waveguide butt coupling techniques. The thickness of a top or bottom cladding layer can be three to five micrometers according to the mode area of the coupling light.

When a suitable magnetic field is established within the region 214 while the cooling beams 202-212 intersect in the region 214, the interaction of the magnetic field and the cooling beams 202-212 create a MOT. The MOT is a region of space within which atoms (e.g., atoms that are present in the space about the ATIP 200) are trapped and cooled. Referring now to FIG. 2B, the ATIP 200 is shown with the MOT depicted as a sphere 228 centered about the region of intersection 214 of the cooling beams 202-212. It is to be understood that while depicted as a sphere 228 for simplicity, atoms in the MOT 228 can be present in a region that has a different shape or an irregular shape. Furthermore, atoms in the MOT 228 remain in motion and are distributed in a cloud within the MOT 228. Thus, a shape of the cloud of atoms in the MOT 228 changes over time. Further, a position of the MOT 228 can refer to a time-averaged position of a center of mass of the atoms trapped in the MOT 228.

Referring once again to FIG. 1, the near-surface formation of cold atoms with a MOT can be established by the MOT lasers 110, but the near-surface formation of cold atoms is severely limited within a distance of about 100 micrometers from the surface of the ATIP 106 (e.g., a surface of the membrane 216). A signal-to-noise ratio of a sensor based upon measurement of neutral atoms trapped by the ATIP 106 can be improved by increasing a number of atoms that can be trapped and guided by the ATIP 106. As noted above, however, the number of atoms trapped by a coarse free-space MOT generally decreases as a diameter of the cooling beams used to form the MOT is decreased. Accordingly, a device based solely on a coarse free-space MOT can have size, weight, and power (SWaP) that are limited by the diameter of cooling beams required to achieve a desired number of trapped atoms.

Referring once again to FIG. 1, the trapping lasers 112 are adapted to control the ATIP 106 such that an EFOT is formed within a distance of about 200 nanometers from a suspended waveguide surface of the ATIP 106. The EFOT is formed by two red-detuned and blue-detuned evanescent fields (e.g., one red-detuned, one blue-detuned) propagating along the suspended waveguide 109. The trapping lasers 112 are optically coupled to the suspended waveguide 109 such that light emitted by at least some of the trapping lasers 112 propagates through the suspended waveguide 109. The trapping lasers 112 can be optically coupled to the suspended waveguide 109 by way of any of various optical and integrated photonics components. By way of example, and not limitation, the trapping lasers 112 can be optically coupled to the suspended waveguide 109 by any or a combination of reflectors, beam splitters, optical couplers, optical fibers, optical waveguides, etc.

The trapping lasers 112 are adapted to emit beams that are red-detuned and blue-detuned with respect to an optical resonant transition frequency of atoms that are desirably loaded into the EFOT formed at the ATIP 106. By way of example, and not limitation, for embodiments wherein the ATIP 106 is adapted to trap cesium atoms, the red-detuned beam can have a wavelength of about 937 nanometers (e.g., 937 nanometers ±5 nanometers, ±3 nanometers, or ±1 nanometers), and the blue-detuned beam can have a wavelength of about 793 nanometers (e.g., 793 nanometers ±5 nanometers, ±3 nanometers, or ±1 nanometers). The red-detuned and blue-detuned beams are coupled to the suspended waveguide 109 such that the beams travel through the suspended waveguide 109.

As it travels through the suspended waveguide 109, the red-detuned beam establishes an attractive evanescent field potential about the suspended waveguide 109. The attractive evanescent field potential can extend into a region of space that includes the MOT. The attractive evanescent field potential causes atoms trapped in the MOT to be drawn closer to a surface of the suspended waveguide 109. Simultaneously, as the blue-detuned beam travels through the suspended waveguide 109, the blue-detuned beam establishes a repulsive evanescent field potential about the suspended waveguide 109. The repulsive evanescent field tends to repel atoms from the surface of the suspended waveguide 109 for compensating near-surface attractive potential, such as van der Waals.

The interaction of the attractive and repulsive evanescent fields about the suspended waveguide 109 tends to create a potential minimum in the vicinity of a surface of the suspended waveguide 109. The interaction of an atom with the evanescent electric fields induces a spatially varying light shift, $\Delta E \approx -h\Omega^2(r)/4\Delta$, where h is the reduced Planck's constant, $\Delta$ is the detuning from resonance, and $\Omega(r)$ is the position dependent Rabi frequency. The resulting dipole force acting on the atoms is the derivative of this potential, $$F_{dip} = -\frac{\partial(\Delta E)}{\partial r}$$

and can be used to trap the atoms. Here, r is the distance from the surface of the suspended waveguide 109. If the wavelength is tuned 'red' from the atomic resonance ($\Delta<0$), this force is attractive, and if tuned 'blue' from resonance ($\Delta>0$), the force is repulsive. In both cases, the force is strongest in regions of high intensity of the evanescent fields. Hence, combining with van der Waals potential, propagation of the red-detuned beam and the blue-detuned beam through the suspended waveguide 109 creates a potential well with a minimum several hundred nanometers from the fiber surface. Atoms in the MOT are attracted to the suspended waveguide 109 by the attractive evanescent field potential but are prevented from striking the suspended waveguide 109 by the repulsive evanescent field potential. The interaction of the attractive and repulsive evanescent field potentials about the suspended waveguide 109 causes an EFOT to be established proximal to a surface of the suspended waveguide 109. For example, the EFOT can be established within a distance of 100 nanometers, a distance of nanometers, or a distance of 50 nanometers of a surface of the suspended waveguide 109.

The EFOT established by the red-detuned and blue-detuned beams traveling through the suspended waveguide 109 allows neutral atoms to be positioned in closer proximity to a surface of the suspended waveguide 109 than is achievable with the MOT established by the MOT lasers 110 alone, for a same number of atoms. For instance, while atoms in the MOT can be held in a cloud that is, on average, centered in proximity to the suspended waveguide 109, individual atoms within the MOT can strike the suspended waveguide 109 and be deflected out of the MOT. In general, the MOT established by the MOT lasers 110 and the magnetic field system 114 is insufficient to trap atoms in a space that is positioned less than about 200 nanometers from the surface of the suspended waveguide 109. Furthermore, due to the positive relationship between the diameter of the cooling beams used to form a MOT and a number of atoms that are trapped by the MOT, for conventional MOTs there is generally a trade-off between a number of atoms trapped and a precision with which those atoms can be positioned.

By holding atoms in close proximity to the suspended waveguide 109, the EFOT, for example, the EF-ODT, allows the ATIP 106 to be used for guiding atoms in cold atom position, navigation, and timing (PNT) sensors. Using the ATIP, guided atom interferometer accelerometers and gyroscopes can be demonstrated, which require fine control of internal atomic state, momentum kicks to construct atom interferometry, and measurement of atom interference fringes. For example, Raman beams (e.g., emitted by the Raman lasers 113) control internal atomic state and provide momentum kicks to perform atom interferometry, which is coupled into the suspended waveguide 109. The probing beam that is emitted by the probe laser 116 and coupled into the suspended waveguide 109 can be used to measure atom interference fringes from trapped atoms in the EFOT.

Doppler-sensitive Raman beams are composed of two counter-propagating beams with a proper configuration of light polarizations ($\sigma^+$, $\sigma^+$, $\sigma^-$ $\sigma^-$, Lin-Perp-Lin), which is based on a stimulated Raman transition that causes the atoms to absorb a photon from one beam and emit a photon into another beam moving in the opposite direction. The quantization axis is aligned along the Raman beams. Therefore, the net momentum kicks of two photons, i.e., the photon recoils, are delivered to the atoms in the light-pulse sequence of atom interferometry, and the atom changes both kinetic energy and internal state. The three light pulses ($\pi/2 \rightarrow \pi \rightarrow \pi/2$) coupled to the suspended waveguide can create the state-dependent momentum kicks on two hyperfine ground states of atoms to split, redirect, and combine atomic wavepackets along the suspended waveguide 109 over light-pulse sequences, which can be used to construct guided cold atom inertial sensor systems 100 such as guided atom accelerometers and gyroscopes. In other embodiments, the atom interferometry may be performed using Bragg pulses or state-dependent momentum kicks from a dipole force.

In other exemplary embodiments, the ATIP 106 can be used in a device that is adapted to trap and position atoms for atomic spin control, atomic spin readout, and interfacing of atomic spins with photonic and electronic devices.

The ATIP 106 can be constructed with micro/nano fabrication techniques, and the photonic and electronic components can be fabricated by way of integrated photonics manufacturing techniques and electronic integrated circuits manufacturing techniques. Thus, the guided cold atom inertial sensor system 100 can be made to have improved SWaP characteristics relative to a free-space cold atom inertial sensor system. Furthermore, the guided cold atom inertial sensor system 100 can be easier to manufacture to various shapes and configurations of sensors (e.g., arrayed sensors, straight guided atom accelerometers, or closed loop, e.g., ring- or $\Omega$-shaped guided atom gyroscopes) as compared to a device that incorporates TOFs that are generally manufactured as a linear shape by high precision fiber-pulling techniques and are not flexible for various shapes and configurations.

As noted above, due to optical absorption loss in the suspended waveguide 109, thermal dissipation can be a limiting factor to performance of the ATIP 106. For instance, the number of atoms that can be trapped by way of the EFOT can increase as the intensity of the attractive and repulsive evanescent fields emanating from the suspended waveguide 109 increases. The intensity of these fields, and in turn the trap depth, is a function of the powers of the red-detuned and blue-detuned trapping beams propagating in the suspended waveguide 109. However, as the powers of the red-detuned and blue-detuned beams are increased, the optical absorption from the suspended waveguide 109 results in greater heat generation that may reach the thermal threshold easily and break the suspended waveguide in vacuum. The vacuum conditions within which the MOT is established (i.e., within the vacuum chamber 108) limits heat dissipation to radiative and conductive means.

With reference now to FIGS. 3A-D, 4A-D, and 5A-D, exemplary ATIPs 300, 400, 500 are shown that are adapted to facilitate establishing an EFOT while dissipating heat generated from a suspended waveguide that is suspended over an opening in a supporting substrate. The heat generated from a suspended waveguide that is disposed on a membrane that is itself deposited on a supporting substrate that has no opening formed therein can be efficiently dissipated in a vacuum. These ATIPs 300, 400, 500 are adapted to support high optical power delivery through suspended membrane waveguides (e.g., greater than 14 mW, greater than 20 mW, or greater than 30 mW) without causing mechanical failure of the suspended waveguide in the ATIPs 300, 400, 500. Various embodiments of the ATIPs 300, 400, 500 have been shown to be capable of producing EFOTs with a trap depth of between about 300 μK or about 1 mK within a distance of about 200 nanometers of a surface of a suspended waveguide. In various embodiments, the ATIP 106 of the guided cold atom inertial sensor system 100 can be or include the ATIPs 300, 400, 500.

Figure 3D:
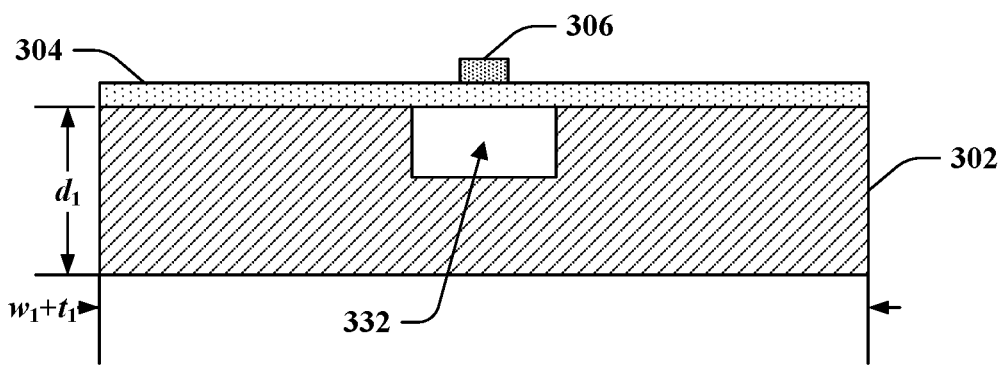

Referring now solely to FIGS. 3A-3D, the exemplary ATIP 300 is shown. FIG. 3A depicts a top-down view of the ATIP 300, FIG. 3B is a thin cross-sectional slice of the ATIP 300 taken along line B-B shown in FIG. 3A, FIG. 3C is a thin cross-sectional slice of the ATIP 300 taken along line C-C, and FIG. 3D is a thin cross-sectional slice of the ATIP 300 taken along line D-D. The ATIP 300 comprises a supporting substrate 302 (shown in FIG. 3A as a dashed line), a membrane 304 supported by the substrate 302, and a suspended waveguide 306 that is disposed on and supported by the membrane 304. The substrate 302 can be formed from, for example, silicon, silicon dioxide, fused-silica, quartz, or other material that is suitable for forming structures using integrated photonics and electronics manufacturing techniques. In exemplary embodiments, the membrane 304 and/or suspended waveguide 306 can be formed from aluminum oxide (alumina), silicon nitride, or aluminum nitride such that the membrane 304 is substantially transparent to cooling beams used to form a MOT for certain atomic species.

The substrate 302 has an opening 308, alternately referred to herein as the substrate opening, formed therein for cooling beams, and the membrane 304 has openings 318, 320, alternately referred to herein as the membrane openings, for MOT atoms. The substrate opening 308 allows cooling/repump beams that are emitted from a position below the substrate 302 to reach the membrane 304 and the suspended waveguide 306. The membrane openings 318, 320 allow MOT atoms to migrate about the suspended waveguide 306 without striking the membrane 304.

The suspended waveguide 306 extends across the substrate opening 308 from a first edge 310 of the substrate 302 to a second edge 312 of the substrate 302, forming an input 314 and an output 316 of the suspended waveguide 306, respectively. The suspended waveguide 306 is supported by the membrane 304, which also extends across at least a portion of the substrate opening 308. The suspended waveguide 306 is formed on the membrane 304 as a ridge waveguide such that light propagates in the membrane 304 and suspended waveguide 306 confined along the path of the suspended waveguide 306. The suspended waveguide 306 is supported by the membrane 304 throughout the length of the suspended waveguide 306 in the ATIP 300. The membrane 304 and the suspended waveguide 306 are each suspended over the substrate opening 308. In other words, within the substrate opening 308 there is no substrate material supporting the membrane 304 and/or the suspended waveguide 306.

The membrane 304 has the openings 318, 320 formed therein. In exemplary embodiments, the membrane 304 can extend across an entirety of the substrate opening 308 in the substrate 302 with the exception of the membrane openings 318, 320. The membrane openings 318, 320 facilitate migration of atoms from below the membrane 304 to a MOT 322 formed above the suspended waveguide 306, as shown in FIG. 3B. The membrane openings 318, 320 therefore define a loading region 324 for the MOT 322 and an EFOT 326. The EFOT 326 can be formed by propagating red-detuned and blue-detuned trapping beams through the suspended waveguide 306. The red-detuned trapping beam establishes an attractive evanescent field 328. The blue-detuned trapping beam establishes a repulsive evanescent field 330. The interaction of the fields 328, 330 and the near-surface attractive potential, which are disposed to at least partially overlap with the MOT 322, establish the EFOT 326. As indicated in FIG. 3C, the membrane 304 can extend across the width wi of the substrate opening 308 outside of the MOT/EFOT loading region 324 (e.g., along line C-C). Collectively, the membrane openings 318, 320 form a substantially circular aperture in the membrane 304. For example, the membrane openings 318, 320 can be circular segments positioned on either side of the suspended waveguide 306 within the loading region 324.

Referring now specifically to FIGS. 3A and 3D, outside of the substrate opening 308 a void 332 can be formed in the substrate 302 such that the suspended waveguide 306 is suspended (on the membrane 304) along the entire length of the suspended waveguide 306 in the ATIP 300. Suspension of the suspended waveguide 306 facilitates confinement of light along the path of the suspended waveguide 306.

Figure 4A:
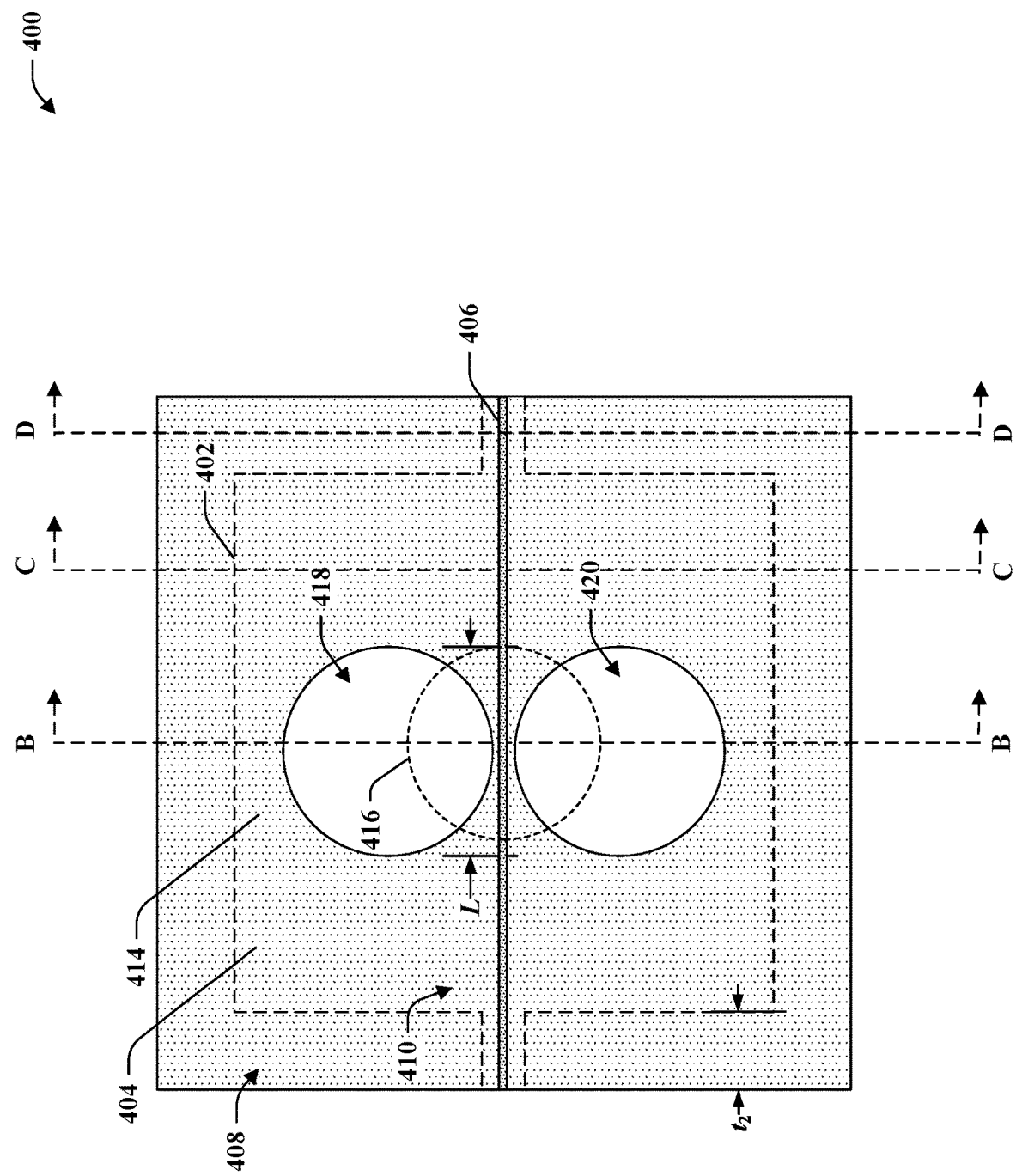
FIG. 4A is a top-down view of still another exemplary ATIP.
Figure 4B:
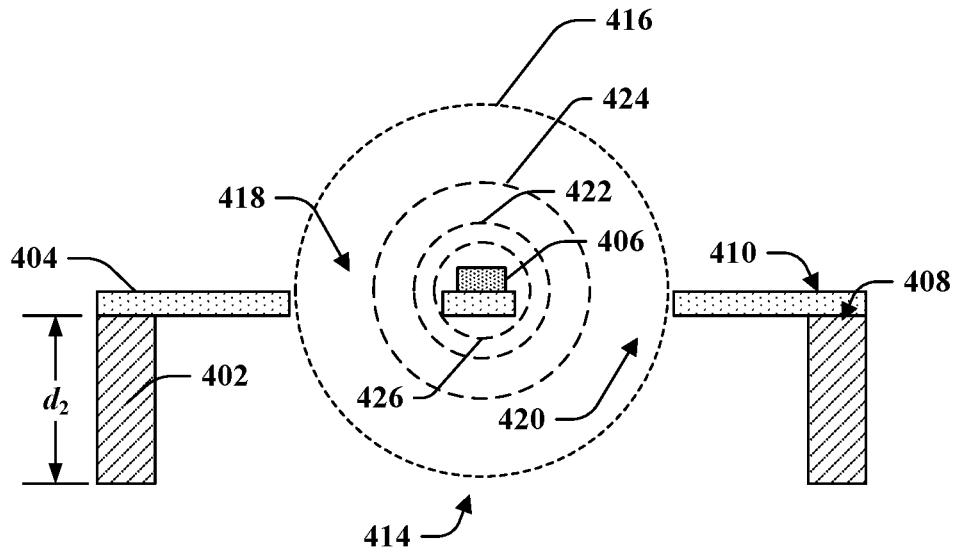
FIGS. 4B-4D are cross-sectional thin slices of the exemplary ATIP of FIG. 4A.
Figure 4C:
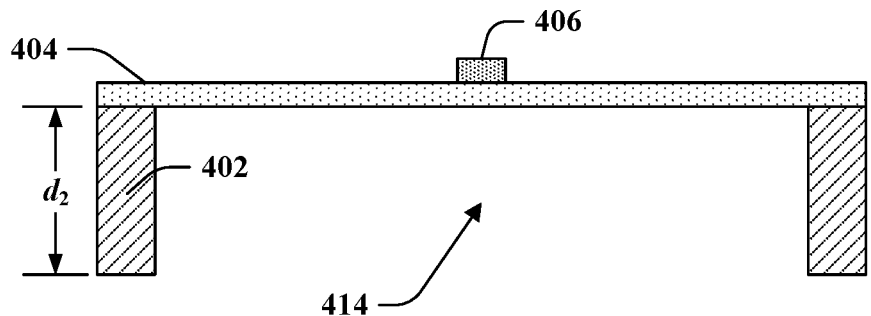
Figure 4D:
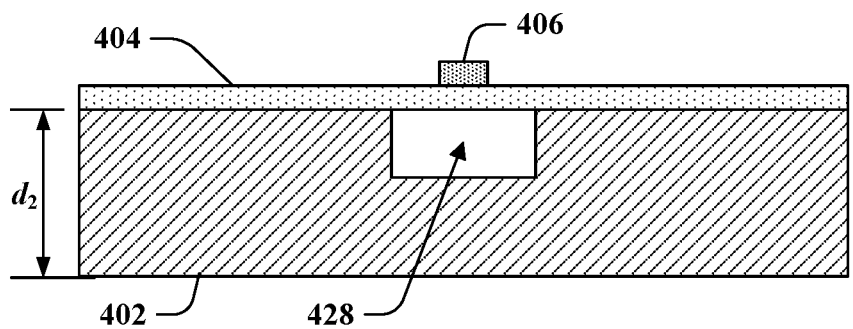

Referring now to FIGS. 4A-4D, the exemplary ATIP 400 is shown. The ATIP 400 can be referred to as an "infinity" configuration. FIG. 4A depicts a top-down view of the ATIP 400, while FIG. 4B is a cross-sectional thin slice of the ATIP 400 cut along line B-B shown in FIG. 4A, FIG. 4C is a cross-sectional thin slice of the ATIP 400 cut along line C-C, and FIG. 4D is a cross-sectional thin slice of the ATIP 400 cut along line D-D. The ATIP 400 comprises a supporting substrate 402 (shown in FIG. 4A as a dashed line), a membrane 404 supported by the substrate 402, and a suspended waveguide 406 that is disposed on and supported by the membrane 404. The substrate 402 can be formed from silicon, silicon dioxide, fused-silica, quartz, or other material with which structures can be formed using integrated electronics and integrated photonics manufacturing techniques. The membrane 404 is supported by the substrate 402. As with the membrane 304, the membrane 404 can, in exemplary embodiments, be formed of aluminum oxide, silicon nitride, or aluminum nitride (or any other transparent membrane materials for the light wavelength of cooling beams used to form a MOT for atoms desirably trapped above the suspended waveguide 406). The membrane 404 can be deposited on a surface 408 of the substrate 402 such that a surface 410 of the membrane 404 is positioned above the surface 408 of the substrate 402.

The substrate 402 has an opening 414 formed therein. The membrane 404 is suspended over the substrate opening 414 formed in the substrate 402. The membrane 404 can be substantially transparent to the cooling beams emitted by the MOT lasers 110. Thus, at least some of the cooling beams can be emitted through the substrate opening 414 in the substrate 402 and through the membrane 404 to intersect in a region proximal to or intersecting with the suspended waveguide 406, forming a MOT 416 (e.g., a cloud of atoms having an extent shown in FIG. 4B). Atoms disposed about the ATIP 400 can be drawn into the MOT 416. The membrane 404 can have two apertures 418, 420 formed therein, allowing atoms that are disposed below the membrane 404 (e.g., on an opposite side of the membrane 404 as the suspended waveguide 406) prior to formation of the MOT 416 to be loaded into the MOT 416.

It is to be understood that the region of space encompassed by the cloud of atoms trapped in the MOT 416 formed above the suspended waveguide 406 can at least partially intersect with the suspended waveguide 406 and/or the membrane 404. However, the center of mass of the MOT can be positioned offset from the suspended waveguide 406 or within the suspended waveguide 406.

The suspended waveguide 406 is supported by the membrane 404 and extends across the opening 414 in the substrate 402. The apertures 418, 420 can be formed in the membrane 404 on opposite sides of the suspended waveguide 406, such that the suspended waveguide 406 extends along the membrane 404 between the apertures 418, 420. The apertures 418, 420 yield a tapering of the membrane 404 material near a center of the opening 414 in the substrate 402. In various embodiments, a portion of the suspended waveguide 406 that is disposed above the opening 414 in the substrate 402 can rest solely on the membrane 404 across the substrate opening 414. In exemplary embodiments, the apertures 418, 420 are substantially circular apertures. However, other aperture geometries are contemplated as being within the scope of the present disclosure.

The red-detuned and blue-detuned beams generated by the trapping lasers 112 can be coupled to the suspended waveguide 406. As described above, propagation of the red-detuned and blue-detuned trapping beams through the suspended waveguide 406 causes an EFOT 422 to be established above the suspended waveguide 406 and proximal to the suspended waveguide 406. The red-detuned beam causes an attractive evanescent field 424 to be established about the suspended waveguide 406, and the blue-detuned beam causes a repulsive evanescent field 426 to be established about the suspended waveguide 406. The interaction of these fields 424, 426 and the near-surface attractive potential establishes the EFOT 422. The EFOT 422 can be positioned closer to the suspended waveguide 406 than the center of the MOT 416. While a center of mass of the MOT 416 and the EFOT 422 may be positioned within approximately similar distance to the suspended waveguide 406, or at an approximately same position, it is to be understood that a cloud of atoms trapped in the EFOT 422 will be distributed in closer proximity to the suspended waveguide 406 than a cloud of atoms trapped in the MOT 416.

The configuration of the membrane 404 supports dissipation of heat generated from the suspended waveguide 406 while facilitating formation of the MOT 416 such that a cloud of atoms trapped by the MOT 416 overlaps with the suspended waveguide 406. The apertures 418, 420 in the membrane 404 allow atoms to move from one side of the membrane 404 to another (e.g., from a side of the membrane 404 that is opposite the suspended waveguide 406 to a same side of the membrane 404 as the suspended waveguide 406). Since the suspended waveguide 406 is deposited on the membrane 404, the membrane 404 itself conducts heat away from the suspended waveguide 406 throughout the length of the suspended waveguide 406. The taper of the membrane 404 toward the center of the opening 414 in the substrate 402 allows atoms to readily move from one side of the membrane 404 to another in the region in which the MOT 416 is formed. The configuration of the membrane 404 also facilitates greater dissipation of heat dissipated by the suspended waveguide 406 than a configuration in which the membrane 404 is strictly conformal to the suspended waveguide 406. As the red-detuned and blue-detuned beams propagate through the suspended waveguide 406, optical absorption in the suspended waveguide 406 causes heat to be dissipated into and through the suspended waveguide 406. The greater area of the membrane 404 compared to a waveguide-conformal membrane facilitates conduction of heat away from the suspended waveguide 406 and provides greater heatsinking ability.

In one embodiment, experimental results have indicated the suspended waveguide 406 can accommodate an optical signal of at least 30 mW. In this embodiment, a length L of a loading region of the suspended waveguide 406, taken to be equivalent to a diameter of the apertures 418, 420 in the infinity design, was about 125 micrometers. In this embodiment, the membrane 404 and the opening 414 in the substrate 402 were squares of approximately 5 millimeters by 5 millimeters.

The exemplary substrate 402 and membrane 404 shown in FIGS. 4A-4D have substantially square or rectangular shapes. For instance, the substrate 402 has a cubic shape with at least partially open top and bottom faces. The exemplary membrane 404 depicted in FIGS. 4A-4D has a square slab shape with the apertures 418, 420 formed therein. However, it is to be understood that in other embodiments, the substrate 402 and membrane 404 can have other shapes. For example, the substrate 402 can have the shape of a cylinder with a partially open top and partial open bottom. In such embodiments, the membrane 404 can have the shape of a circular slab with the apertures 418, 420 formed therein. It is to be understood that the configuration of the substrate 402 can be adapted to accommodate a selected design of the membrane 404 and/or the suspended waveguide 406.

In exemplary embodiments, the substrate 402 has a void 428 formed therein. The void 428 can be positioned below the suspended waveguide 406 and membrane 404, such that the suspended waveguide 406 is suspended throughout its length in the ATIP 400.

Figure 5A:
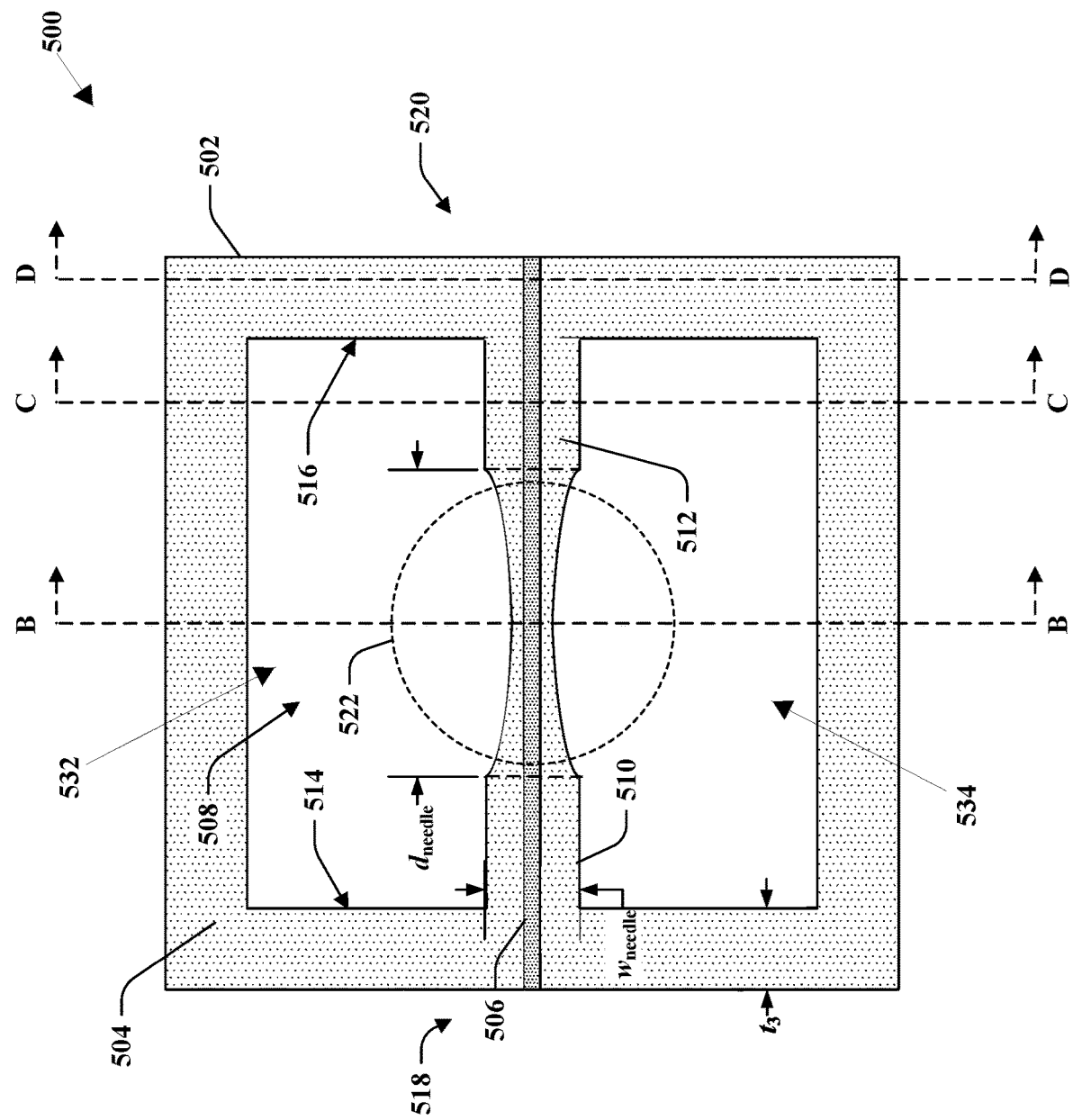
FIG. 5A is a top-down view of yet another exemplary ATIP.
Figure 5B:
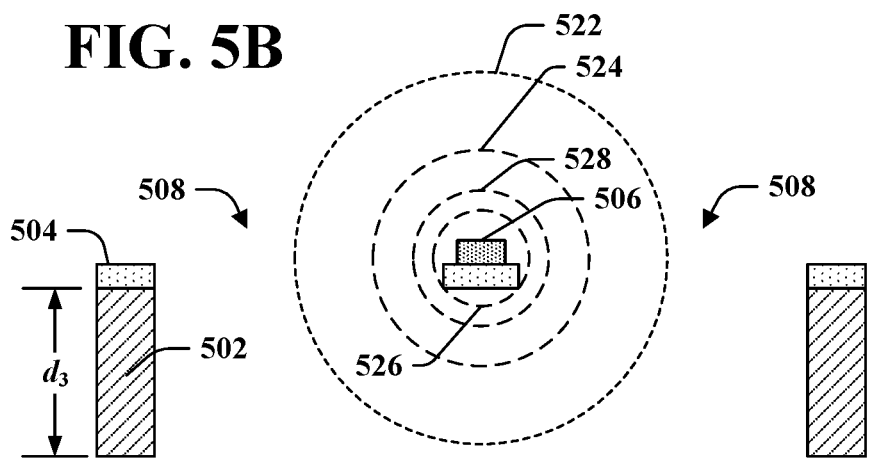
FIGS. 5B-5D are cross-sectional thin slices of the exemplary ATIP of FIG. 5A.
Figure 5C:
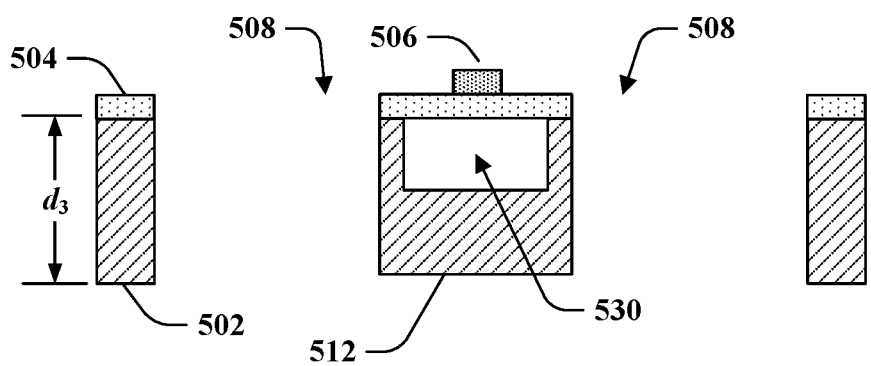
Figure 5D:
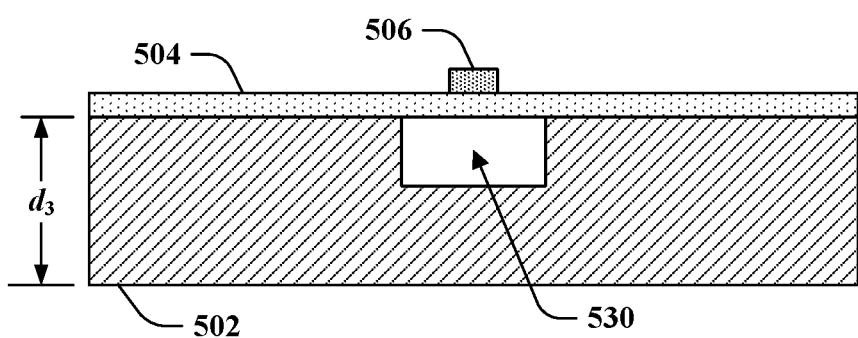

Referring now to FIGS. 5A-5D, the exemplary ATIP 500 is shown. FIG. 5A depicts a top-down view of the exemplary ATIP 500. FIG. 5B depicts a cross-sectional thin slice of the ATIP 500 cut along line B-B shown in FIG. 5A. FIG. 5C depicts a cross-sectional thin slice of the ATIP 500 cut along line C-C shown in FIG. 5A. FIG. 5D depicts a cross-sectional thin slice of the ATIP 500 cut along line D-D. The ATIP 500 includes a substrate 502, a membrane 504, and a suspended waveguide 506 that is disposed on the membrane. The substrate 502 has an opening 508 formed therein. The substrate 502 includes a first needle structure 510 and a second needle structure 512 that extend into the opening 508 in the substrate 502 from opposite sides of the opening 508. For example, the ATIP 500 shown in FIGS. 5A-5D depicts a square opening, and the first needle structure 510 extends outward into the opening 508 from a first interior wall 514 of the substrate 502. The second needle structure 512 extends outward into the opening 508 from a second interior wall 516 of the substrate 502, the first interior wall 514 being opposite the second interior wall 516. The needle structures 510, 512 can be formed from a same material as the substrate 502 (e.g., silicon, silicon dioxide, fused-silica, quartz, or the like) and can further be monolithically integrated with the substrate 502 (e.g., formed by etching material from the substrate 502).

In the exemplary ATIP 500, the membrane 504 extends across the opening 508 in the substrate 502 between the first needle structure 510 and the second needle structure 512. The suspended waveguide 506 extends across the membrane 504 and extends further across the needle support structures 510, 512 to opposite edges 518, 520 of the substrate 502. The membrane 504 has a taper toward a center of the suspended waveguide 506 within the opening 508 in the substrate 502. In the exemplary ATIP 500 shown, a portion of the membrane 504 that extends between the needle structures 510, 512 has a width that is less than or equal to a width $W_{needle}$ of the needle structures 510, 512.

In the exemplary ATIP 500, the membrane 504 extends only between the two needle structures 510, 512. The configuration of the membrane 504 allows cooling beams to readily pass through the opening 508 in the substrate 502 to form a MOT 522 about the suspended waveguide 506. Due to the limited extent of the membrane 504, atoms are also able to readily migrate toward the MOT 522 without interference from the membrane 504 due to the presence of much larger apertures 532, 534. It is to be understood, however, that the membrane 504 can instead be configured to extend across substantially the entirety of the opening 508 in the substrate 502, excepting much smaller apertures to allow atom migration, in similar fashion to the apertures 418, 420 in the membrane 404.

As described above with respect to the ATIPs 300, 400, red-detuned and blue-detuned trapping beams can be coupled into the suspended waveguide 506. The red-detuned beam establishes an attractive evanescent field 524 about the suspended waveguide 506. The blue-detuned beam establishes a repulsive evanescent field 526 about the suspended waveguide 506. The interaction of these fields 524, 526 and the near-surface attractive potential with atoms trapped in the MOT establishes an EFOT 528 about the suspended waveguide 506.

While the needle structures 510, 512 can interfere with transmission of the cooling beams through the opening 508, or the migration of atoms through the opening 508, the needle structures 510, 512 facilitate conduction of generated heat away from the suspended waveguide 506 and into the bulk of the substrate 502. Experimental results have indicated that one embodiment of the ATIP 500 can support an optical power of 20 mW through the suspended waveguide 506 when the length of the suspended waveguide 506 that extends between the needle structures 510, 512 is about 250 micrometers.

As shown in FIGS. 5C and 5D, the needle structure 512 has a void 530 formed therein, such that the suspended waveguide 506 and membrane 504 are suspended over the needle structure 512 throughout the length of the needle structure 512. The void 530 can further extend into the remainder of the substrate 502 such that the suspended waveguide 506 is suspended along its entire extent in the ATIP 500.

In various embodiments, the suspended waveguides 306, 406, 506 of the ATIPs 300, 400, 500 can have a thickness (e.g., the thickness $t_{waveguide}$ shown in FIG. 3C) of less than or equal to 150 nanometers, less than or equal to 125 nanometers, less than or equal to 100 nanometers, or less than or equal to 75 nanometers. In some embodiments, the membranes 304, 404, 504 can be selected to have a thickness that is less than the thickness of the suspended waveguides 306, 406, 506, such that the suspended waveguides 306, 406, 506 are ridge waveguides. In such embodiments, the membrane 504 can have a thickness of less than or equal to 75 nanometers, less than or equal to 50 nanometers, or less than or equal to 25 nanometers. In other embodiments, the membranes 304, 404, 504 can be selected to have a thickness that yields an anti-reflection effect with respect to the cooling beams used to form the MOT 416. For example, an aluminum oxide (alumina) membrane 404 can be selected to have a thickness of about 260 nanometers, which has been shown to result in an anti-reflection effect that yields a transmission of greater than 95% with respect to an 852 nanometer cooling beam that is adapted to cool cesium atoms.

In exemplary embodiments, a distance $d_{needle}$ between the needle structures 510, 512 can be less than or equal to approximately 750 micrometers, less than or equal to approximately 600 nanometers, or less than or equal to approximately 500 nanometers. In these and other embodiments, the width $w_{needle}$ of the needle support structures 510, 512 can be less than or equal to approximately 500 micrometers, less than or equal to approximately 400 micrometers, or less than or equal to approximately 250 micrometers.

Furthermore, the substrates 302, 402, 502 can be configured with features that facilitate sinking heat from the suspended waveguides 306, 406, 506 and/or radiating generated heat. By way of example, substrate depths $d_1$, $d_2$, or $d_3$ or thicknesses $t_1$, $t_2$, or $t_3$ of the substrates 302, 402, 502, respectively, can be selected to improve a thermal threshold (e.g., a failure threshold of the suspended waveguides 306, 406, 506) or yield a desired thermal equilibrium of the suspended waveguides 306, 406, 506 at an operating point of the suspended waveguides 306, 406, 506 (e.g., a given optical input power to establish an EFOT). In still further embodiments, the substrates 302, 402, 502 can include features that are intended to radiate heat away from the suspended waveguides 306, 406, 506 and/or the MOT and EFOT. For example, the substrates 302, 402, 502 can include fins, ridges, bumps, or other features (not shown) that facilitate radiation of heat.

FIGS. 6-9 illustrate exemplary methodologies relating to forming an ATIP that includes a suspended waveguide. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 6:
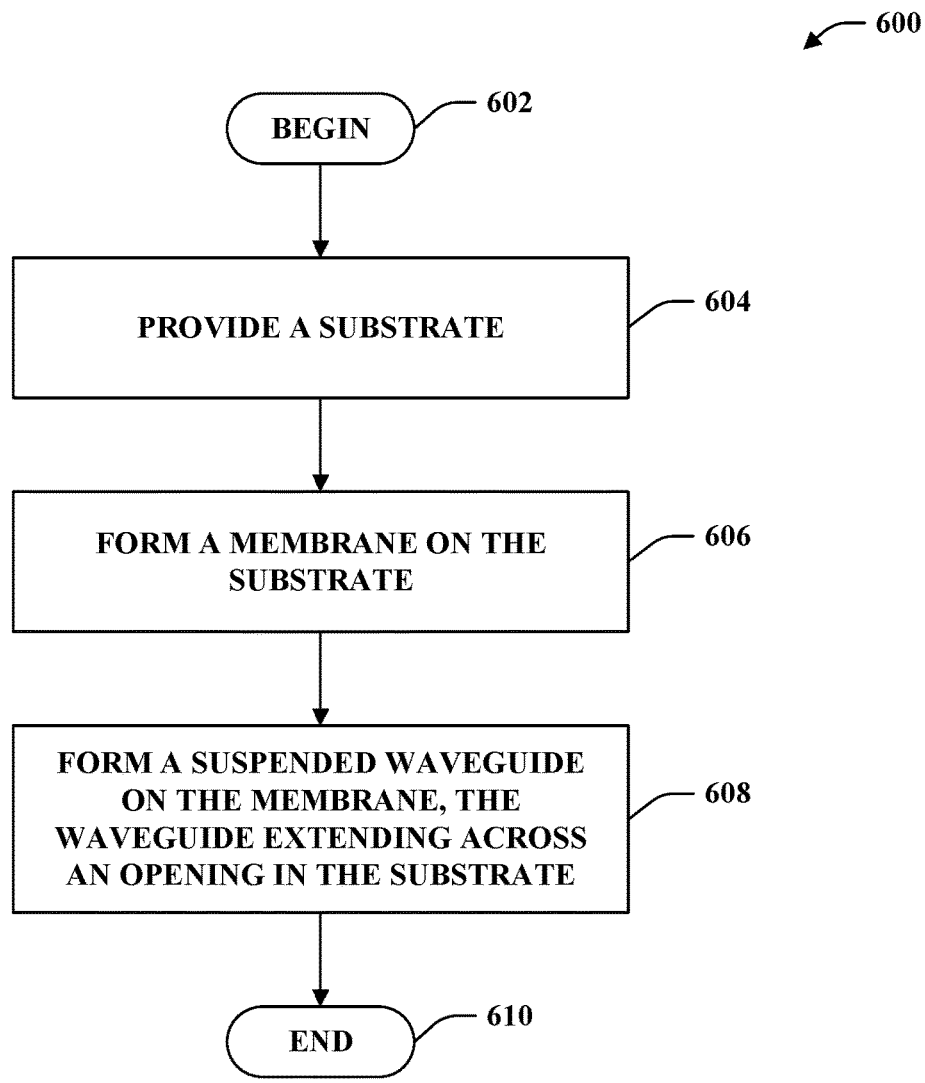
FIG. 6 is a flow diagram that illustrates an exemplary methodology for making an ATIP.

Referring now to FIG. 6, a methodology 600 that facilitates forming an ATIP that includes a suspended waveguide is illustrated. The methodology 600 begins at 602, and at

604, a substrate is provided. In exemplary embodiments, the substrate can be formed from a silicon, silicon dioxide, fused-silica, or quartz wafer. At 606, a membrane that extends across a portion of the opening is formed. In an exemplary embodiment, the membrane is formed by depositing the membrane on a front side of the substrate. At 608, a suspended waveguide is formed on the membrane such that the suspended waveguide (and a portion of the membrane on which the suspended waveguide is formed) extends across an opening in the substrate. The suspended waveguide can be formed by depositing a waveguide material on the membrane. The opening in the substrate can be formed as a separate processing step by etching a backside of the substrate (e.g., an opposite side of the substrate from the side on which the membrane and suspended waveguide are deposited). The methodology 600 ends at 610.

Figure 7:
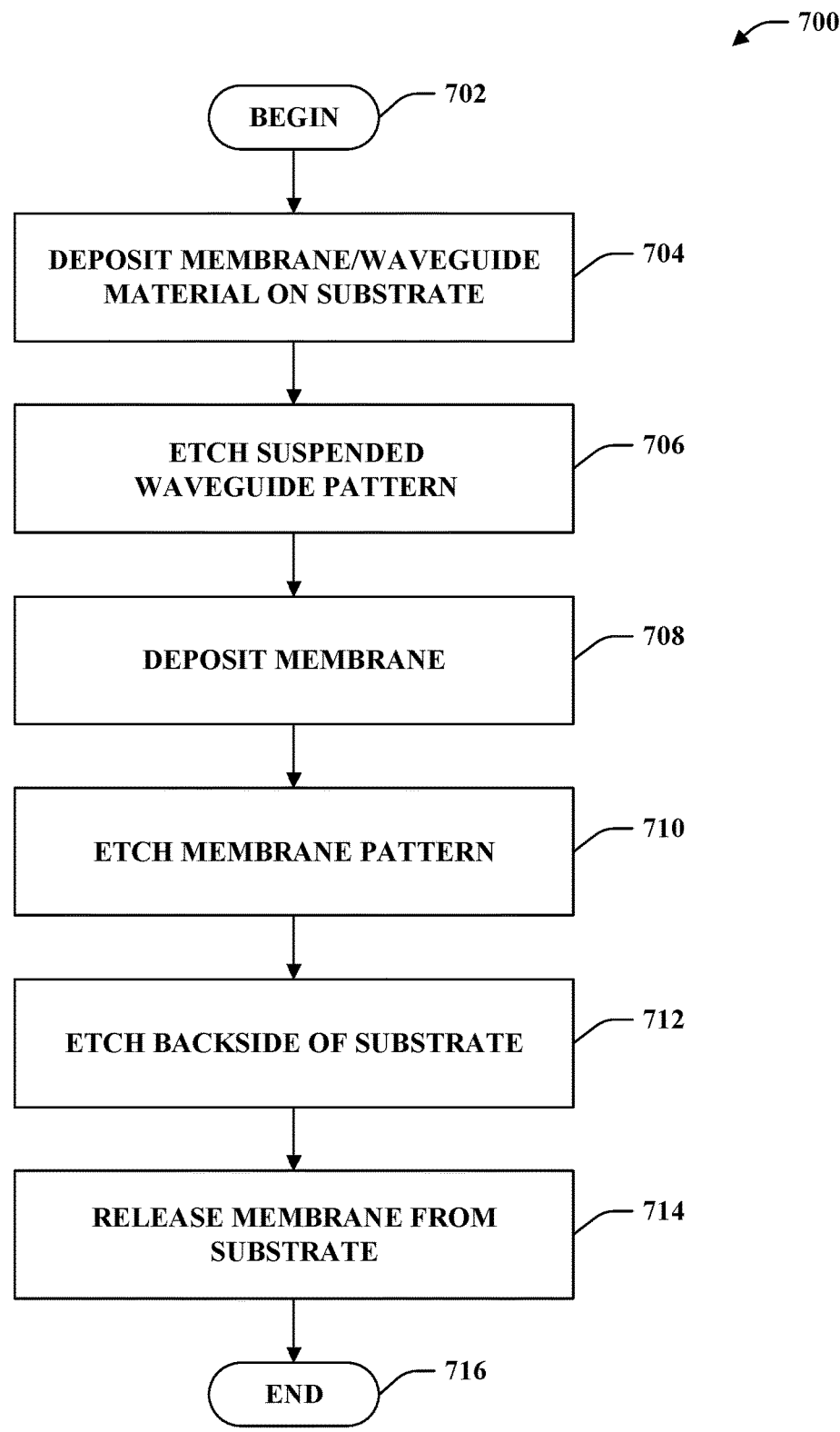
FIG. 7 is a flow diagram that illustrates another exemplary methodology for making an ATIP.
Figure 8:
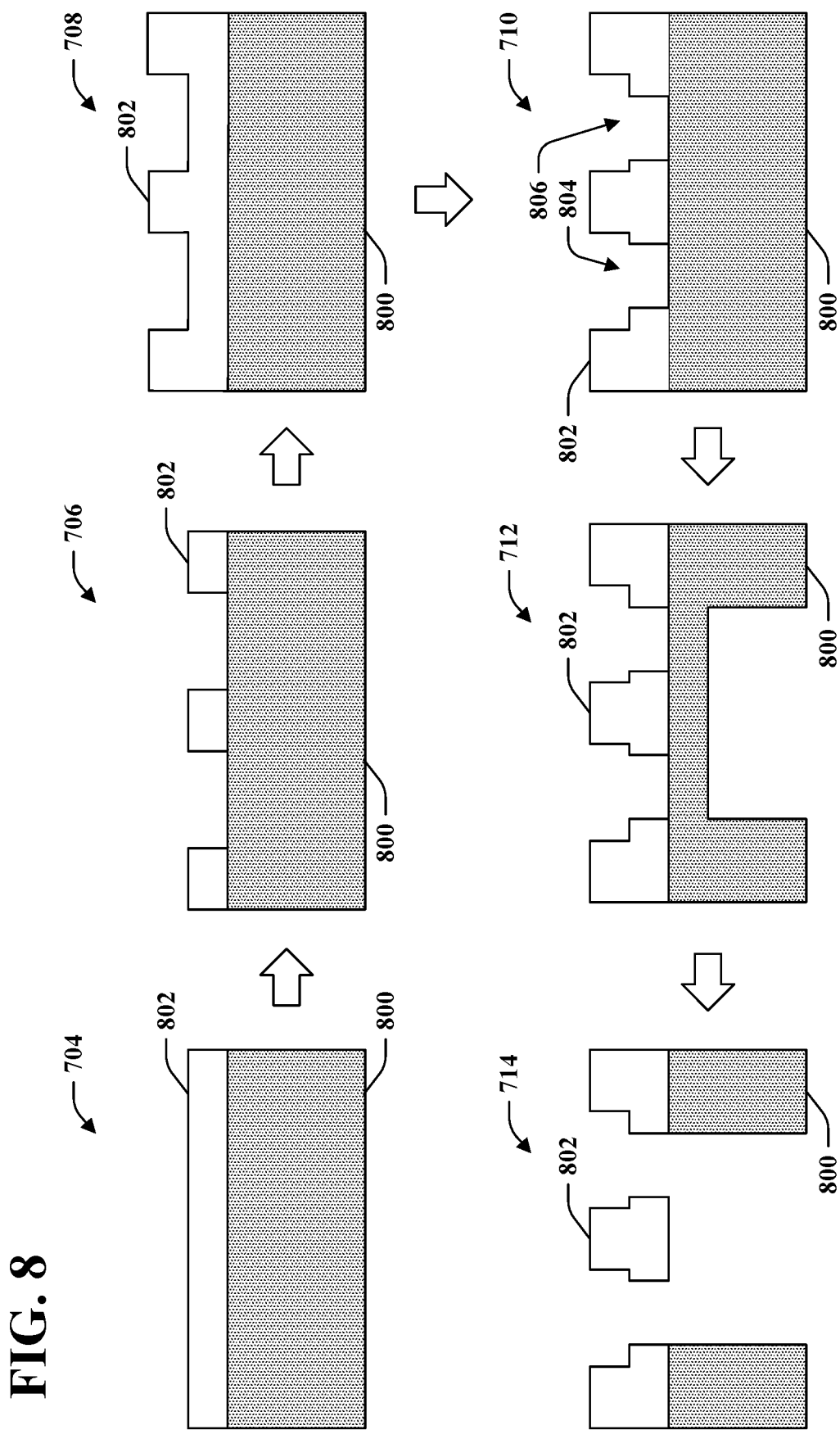
FIG. 8 is a pictorial diagram illustrating process steps of the exemplary methodology of FIG. 7.

Referring now to FIGS. 7 and 8, an exemplary methodology 700 for forming an ATIP that includes a suspended waveguide suspended across the substrate opening in a substrate is described. FIG. 7 is a flow diagram of the exemplary methodology 700. FIG. 8 is a pictorial diagram of various process steps of the methodology 700, showing a side view of a thin slice of the ATIP at each stage.

The methodology 700 begins at 702, and at 704, a membrane/waveguide material is deposited on a substrate. In exemplary embodiments, the substrate can be silicon, silicon dioxide, fused-silica or quartz, and the membrane/waveguide material can be aluminum oxide (alumina), silicon nitride, aluminum nitride, or the like. The membrane/waveguide material can be deposited by atomic layer deposition. With reference to FIG. 8, a substrate 800 is shown with a membrane/waveguide material layer 802 deposited thereon at step 704. Referring once again to FIG. 7, at 706, a suspended waveguide pattern is etched into the membrane/waveguide material deposited at 704. By way of example, and not limitation, the membrane/waveguide material can be etched by way of inductively coupled plasma reactive-ion etching (ICP-RIE). At 708, a membrane material is deposited on the patterned membrane/waveguide material that was deposited and patterned at 704 and 706, respectively. At 710, a membrane pattern is etched into the membrane material deposited at 708. By way of example, and referring once again to FIG. 8, apertures 804, 806 can be etched into the membrane material 802. Referring again to FIG. 7, at 712, a backside of the substrate is etched to form a window in the substrate beneath a suspended waveguide formed on the frontside. The window can form, for example, the substrate opening 314 in the substrate 302 of the ATIP 300. The etching step at 712 can be performed using a deep reactive ion etch (DRIE) Bosch process, stopping short of the membrane/waveguide material by a few tens of micrometers (e.g., 30 micrometers or less). At 714, the backside of the substrate can be further etched to release the membrane and suspended waveguide from support by the substrate, whereupon the methodology 700 ends at 716. The etching of the substrate at 714 can be performed by a xenon difluoride ($XeF_2$) etch.

Figure 9:
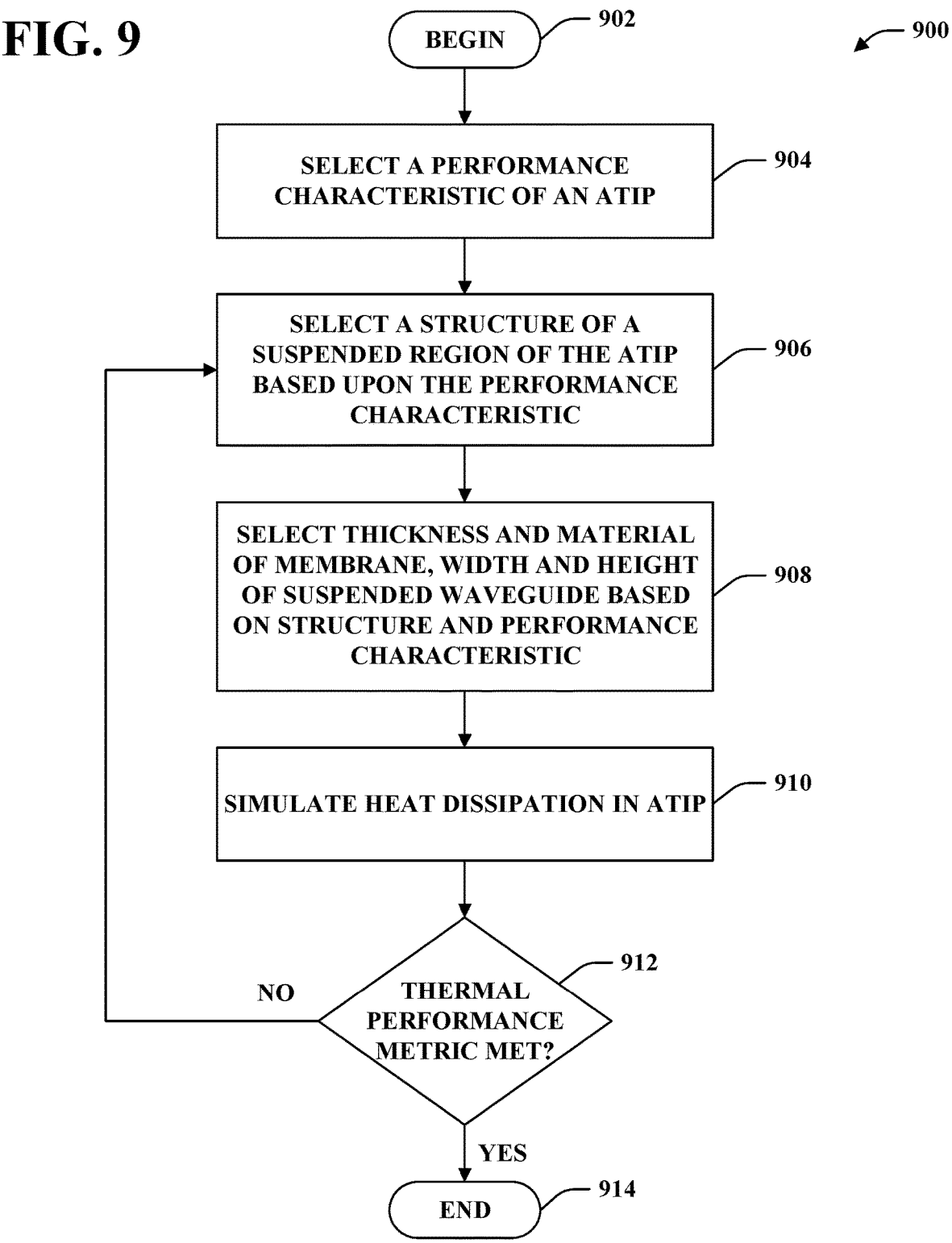
FIG. 9 is a flow diagram that illustrates an exemplary methodology for designing an ATIP.

Referring now to FIG. 9, an exemplary methodology 900 that facilitates design of an ATIP is illustrated. The methodology 900 begins at 902, and at 904, a performance characteristic is selected. The performance characteristic can be, for example, a number of atoms desirably trapped in the MOT, a number of atoms desirably trapped in the EFOT, a trap depth and/or shape of the EFOT, a combination thereof, etc. At 906, a structure of a suspended region is selected based upon the performance characteristic, wherein a suspended region of an ATIP refers to a portion of the ATIP extending across an opening in a substrate. The structure of the suspended region can include, for example, width and length of a membrane and/or suspended waveguide across the opening of the substrate, and/or a size of supporting needle structures disposed beneath the membrane and suspended waveguide.

At 908, a thickness and material of the membrane, as well as width and height of the suspended waveguide deposited on the membrane are selected based upon the selected performance characteristic. By way of example, and not limitation, the thickness and material of the membrane can be selected to maximize transmittance of the membrane with respect to cooling/repump beams used to form a MOT in the vicinity of the ATIP. The wavelength of the cooling/repump beams is determined by alkali atoms that are intended to be trapped within the MOT. The thickness and index of refraction of the membrane determines the transmittance of the membrane with respect to the cooling/repump beams. In another exemplary embodiment, the width and height of the suspended waveguide, as well as the thickness of the membrane, can be selected at 908 to optimize the trap depth of an EFOT formed by red-detuned and blue-detuned trapping beams propagating in the suspended waveguide, given the structure of the suspended region selected at 906. In still another embodiment, the width and height of the suspended waveguide and the thickness of the membrane can be selected at 908 to yield a specified shape of the EFOT.

At 910, heat dissipation of the ATIP is determined by thermal performance simulations. In these simulations, performance of the ATIP is modeled assuming that the ATIP is disposed in a vacuum, and that red-detuned and blue-detuned trapping lasers are propagating through the suspended waveguide of the ATIP. At 912, if the thermal performance simulations at 910 indicate that the ATIP meets a specified thermal performance metric, the methodology 900 completes at 914. Otherwise, the methodology 900 returns to 906, whereupon steps 906 and 908 are repeated and parameters of the ATIP design are modified until both the performance characteristic selected at 904 and the thermal performance metric at 912 are met. In exemplary embodiments, the thermal performance metric can specify, for example, a maximum allowable temperature of the suspended waveguide of the ATIP (e.g., a temperature at which the suspended waveguide is expected to fail mechanically).

Figure 10:
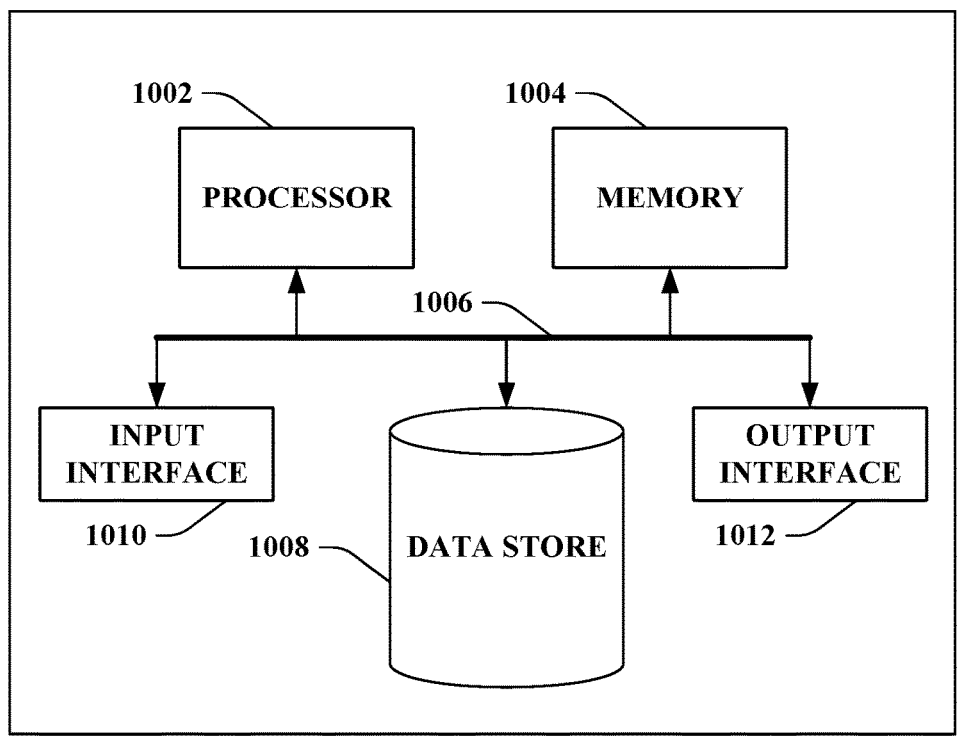
FIG. 10 is an exemplary computing system.

Referring now to FIG. 10, a high-level illustration of an exemplary computing device 1000 that can be used in accordance with the systems and methodologies disclosed herein is illustrated. For instance, the computing device 1000 may be used in a system that controls the operation of lasers or a magnetic field system used in a guided cold atom inertial sensor system (e.g., as part of the control system 104 of the guided cold atom inertial sensor system 100). The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store control feedback data, sensor readout data, etc.

The computing device 1000 additionally includes a data store 1008 that is accessible by the processor 1002 by way of the system bus 1006. The data store 1008 may include executable instructions, control feedback data, sensor data, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc., by way of the output interface 1012. For a single-axis guided atom-interferometry accelerometer with a straight suspended waveguide, the atoms trapped by the EFOT, e.g., an evanescent-field dipole trap, are guided along the direction of the straight suspended waveguide and the sensing axis of the accelerometer is also aligned with the direction of the suspended waveguide, called the on-axis of the guided atom accelerometer. Thus, the atoms trapped by this EFOT experience Doppler shifts due to the on-axis acceleration because the atoms are not confined along the on-axis. The computing device 1000 can be adapted to calculate the motion of the sensor platform on a vehicle which has specific trajectories, estimate the state of the guided atoms for atom interferometry operation, and provide the feedforward to compensate the Doppler shift through the detuning and intensity of Doppler sensitive Raman beams, Bragg pulses, or the state-dependent momentum kicks with a dipole force. In some embodiments, this kind of feedforward scheme can be applied to multi-axes and/or arrayed configurations of guided atom accelerometers and gyroscopes.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The following provides a few potential applications for one or more embodiments of the present invention, typically through the integration of photonics and/or electronics on the substrate used to form the ATIP. For example, optical resonators based upon photonic crystals, Bragg reflectors, and ring cavities may be employed for quantum optics or cavity quantum electro-dynamic processes, such as may be used in the field of quantum information science. As another example, Mach-Zehnder interferometric waveguides may be employed for light amplitude modulation using, for example, electro-optic phase shifters.

Added functionality can also come from heterogeneously integrated (HI) photonics, for example, silicon photonics with III-V materials (for lasing or light amplification) and nonlinear materials (for light modulation and nonlinear process such as frequency doubling). For example, these HI photonics can integrate both III-V lasing (InP) and silicon photonic modulation (1560 nm), in which light from a III-V laser is coupled to a silicon photonic modulator that can provide optical frequency and optical amplitude modulation through the use of PN junctions, typically related to free carrier depletion. HI photonics can also provide optical detection through the use of photodiodes, avalanche photodiodes, or photoconductors. Optical phase shifting can be implemented using the thermo-optic or electro-optic effect devices. These HI photonics will readily work in the commonly used telecommunications C band of wavelengths (1530 nm to 1565 nm). A further advantage of silicon-based photonics is that they are readily mass produced using very mature silicon fabrication technology. III—V-based photonics provide greater flexibility, especially with respect to operating wavelength (ultraviolet (UV) through infrared (IR) depending upon the material), but employ less mature fabrication technologies. III—V-based photonics, with material grown, for example, by metalorganic chemical vapor deposition (MOCVD), can include optical sources (such as lasers or light emitting diodes (LEDs)), optical amplifiers, and optical modulators, which may employ quantum well-based structures. In yet other cases, nonlinear photonics may be implemented, for example, using piezoelectric material, such as a thin-film lithium niobate waveguide by itself or as a hybrid structure when bonded with silicon nitride, thereby permitting optical frequency summing, optical frequency differencing, and optical frequency doubling, etc.

Optical switching functionality may be incorporated using piezoelectric material, for example, aluminum nitride (AlN) on a silicon nitride waveguide, by mechanically changing evanescent field coupling between adjacent waveguides. Piezoelectric material also permits optical modulation using the acousto-optic effect. Polymer waveguides printed, for example, with 3D direct laser writing, may be used for device-to-device or chip-to-chip interconnects further expanding optical functionality.

Electrical and electromagnetic functionality may also be integrated into the ATIP substrate. For example, microwave or radio frequency (RF) transmission lines and antennas may be used for controlling a single qubit (trapped atom) or a collection of atoms. This individual qubit control is necessary for scalable quantum computation platforms. Direct current (DC) voltage electrodes can be used for electric field control, for example, in a Rydberg entanglement for neutral atoms. Current driving lines, for example, as found in an atom chip configuration, may be employed for magnetic field control of surface magnetic traps or a MOT. In addition, the trapped atoms with membrane integrated photonics can be used for quantum nodes in quantum networks.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. An atom trap integrated platform (ATIP), comprising:
   a substrate having an opening formed therein, the substrate comprising first and second needle support structures, the first and second needle support structures extending into the substrate opening;
   a membrane that extends between the first and second needle support structures; and
   a suspended optical waveguide core formed on the membrane such that the suspended optical waveguide core extends across the substrate opening between the first and second needle support structures, the suspended optical waveguide core adapted to propagate an optical signal along a length of the suspended optical waveguide core.

2. The ATIP of claim 1, wherein the membrane tapers inward between the first and second needle support structures.

3. The ATIP of claim 1, wherein a distance between the first and second needle support structures is less than or equal to approximately 750 micrometers.

4. The ATIP of claim 1, wherein a width of the first and second needle support structures is less than or equal to 500 approximately micrometers.

5. An atom trap integrated platform (ATIP), comprising:
   a substrate having an opening formed therein;
   a membrane extending across a portion of the substrate opening, the membrane having first and second apertures formed therein; and
   a suspended optical waveguide core formed on the membrane such that the suspended optical waveguide core extends across the substrate opening and between the first and second apertures in the membrane, the suspended optical waveguide core adapted to propagate an optical signal along a length of the suspended optical waveguide core.

6. The ATIP of claim 5, wherein the membrane extends across the entirety of the substrate opening except for the first and second apertures.

7. The ATIP of claim 5, wherein the first and second apertures are positioned such that the membrane tapers inward toward the suspended optical waveguide core at a center of the substrate opening.

8. The ATIP of claim 5,
   wherein the substrate includes first and second needle support structures, the first needle support structure extending into the substrate opening from a first interior wall of the substrate, the second needle support structure extending into the substrate opening from a second interior wall of the substrate; and
   wherein the suspended optical waveguide core is positioned above the first and second needle support structures.

9. The ATIP of claim 5 further comprising an optical device, the optical device including at least one of an optical resonator, an interferometric waveguide, an optical frequency modulator, an optical amplitude modulator, a photodiode, an avalanche photodiode, a photoconductor, an optical phase shifter, a laser, a light emitting diode, an optical amplifier, an optical modulator, an optical frequency summer, an optical frequency difference, an optical frequency doubler, an optical switch, or a waveguide, the at least one optical device formed on the substrate.

10. The ATIP of claim 5 further comprising an electromagnetic device, the electromagnetic device including at least one of a microwave transmission line or antenna, a radio frequency (RF) transmission line or antenna, direct current (DC) voltage electrodes, or a current driving line, the at least one electromagnetic device formed on the substrate.

11. The ATIP of claim 5 further comprising:
   a magnetic field system adapted to establish a magnetic field within a region;
   a first laser system adapted to create a magneto-optical trap (MOT) proximal to the suspended optical waveguide core by emitting a plurality of cooling beams into the region, wherein one or more of the plurality of cooling beams passes through the substrate opening; and
   a second laser system coupled to the suspended optical waveguide core, the second laser system adapted to emit a first beam of light that is red-detuned with respect to a resonant optical transition frequency of atoms in the MOT, the second laser system further adapted to emit a second beam of light that is blue-detuned with respect to the resonant optical transition frequency, wherein propagation of the first and second beams within the suspended optical waveguide core is adapted to cause an evanescent field optical trap (EFOT) to be formed above the suspended optical waveguide core.

12. The apparatus of claim 11,
wherein the substrate comprises first and second needle support structures that extend into the substrate opening; and
wherein the membrane and the suspended optical waveguide core extend across the substrate opening between the first and second needle support structures.

13. The apparatus of claim 11, wherein the MOT is formed at a distance of at least approximately 200 nanometers away from the suspended optical waveguide core.

14. The apparatus of claim 11, wherein the EFOT is formed at a distance of less than approximately 200 nanometers above the suspended optical waveguide core.

15. The apparatus of claim 11, wherein the atoms in the MOT are cesium atoms or rubidium atoms.

16. The apparatus of claim 11, wherein the atoms in the MOT are electrically neutral.

17. The apparatus of claim 11, further comprising a vacuum chamber, the substrate, the membrane, and the suspended optical waveguide core positioned within the vacuum chamber.

18. The apparatus of claim 11,
wherein the membrane is substantially transparent to the cooling beams;
wherein the membrane is composed substantially of one of aluminum oxide, silicon nitride, or aluminum nitride; and
wherein the membrane has a transmittivity of greater than or equal to 90% with respect to the plurality of cooling beams.

19. The apparatus of claim 11, wherein the substrate is composed substantially of one of silicon, silicon dioxide, fused-silica, or quartz.

\* \* \* \* \*

UNITED STATES PATENT AND TRADEMARK OFFICE
CERTIFICATE OF CORRECTION

| | | |
|---|---|---|
| PATENT NO. | : 11,914,188 B1 | Page 1 of 1 |
| APPLICATION NO. | : 17/546302 | |
| DATED | : February 27, 2024 | |
| INVENTOR(S) | : Jongmin Lee et al. | |

It is certified that error appears in the above-identified patent and that said Letters Patent is hereby corrected as shown below:

In the Specification

Column 1, Line 42, please delete "–10 µK" and insert therefore -- ~10 µK --.

Signed and Sealed this
Twenty-sixth Day of March, 2024

Katherine Kelly Vidal
*Director of the United States Patent and Trademark Office*